US012699337B2

(12) United States Patent
Yada et al.

(10) Patent No.: US 12,699,337 B2
(45) Date of Patent: Aug. 4, 2026

(54) DEVELOPER ACCOMMODATING UNIT WITH STIRRING MEMBER AND VISOR PORTION

(71) Applicants: Takayuki Yada, Shizuoka (JP); Ryuta Murakami, Shizuoka (JP); Yuko Harada, Kanagawa (JP); Teruhiko Sasaki, Shizuoka (JP)

(72) Inventors: Takayuki Yada, Shizuoka (JP); Ryuta Murakami, Shizuoka (JP); Yuko Harada, Kanagawa (JP); Teruhiko Sasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/912,753

(22) Filed: Oct. 11, 2024

(65) Prior Publication Data

US 2026/0104659 A1 Apr. 16, 2026

(30) Foreign Application Priority Data

Oct. 13, 2023 (JP) ................................ 2023-177812

(51) Int. Cl.
*G03G 15/08* (2006.01)
*G03G 21/18* (2006.01)

(52) U.S. Cl.
CPC ..... *G03G 15/0889* (2013.01); *G03G 21/1814* (2013.01)

(58) Field of Classification Search
CPC ........... G03G 15/0887; G03G 15/0889; G03G 15/0896; G03G 21/181; G03G 21/1814; G03G 21/1821

(Continued)

(56) References Cited

U.S. PATENT DOCUMENTS

| | | |
|---|---|---|
| 9,052,638 B2 | 6/2015 | Matsumaru et al. |
| 9,069,289 B2 | 6/2015 | Batori et al. |

(Continued)

FOREIGN PATENT DOCUMENTS

| | | |
|---|---|---|
| JP | H06-27793 A | 2/1994 |
| JP | 2002-372843 A | 12/2002 |

(Continued)

OTHER PUBLICATIONS

Co-pending U.S. Appl. No. 18/904,259, filed Oct. 2, 2024.

(Continued)

*Primary Examiner* — Hoang X Ngo
(74) *Attorney, Agent, or Firm* — Venable LLP

(57) ABSTRACT

A developer accommodating unit includes a container and a stirring member. The container includes first and second frames mutually bonded to constitute an accommodating space for a developer. The stirring member stirs the developer by being rotated in a rotational direction and includes a sheet fixed to a rotational shaft. The first frame includes a recessed portion provided along an edge of the first frame and opening toward an upstream side in the rotational direction. The second frame includes a projection provided along an edge of the second frame, projects toward a downstream side in the rotational direction and engages with the recess, and so as to prevent the sheet from contacting an end surface, on the upstream side, of an inner end of the recess and includes a part of an inner wall constituting the accommodating space, a visor provided on a position opposite to the end surface.

12 Claims, 17 Drawing Sheets

(a)

(b)

(58) Field of Classification Search
USPC .......................................... 399/111, 262–263
See application file for complete search history.

(56) References Cited

U.S. PATENT DOCUMENTS

| | | | |
|---|---|---|---|
| 9,116,466 | B2 | 8/2015 | Makiguchi et al. |
| 9,164,430 | B2 | 10/2015 | Murakami et al. |
| 9,523,942 | B2 | 12/2016 | Takeuchi et al. |
| 9,599,932 | B2 | 3/2017 | Takeuchi et al. |
| 9,989,892 | B2 | 6/2018 | Takeuchi et al. |
| 10,095,161 | B2 | 10/2018 | Takeuchi et al. |
| 10,627,780 | B2 | 4/2020 | Fujiwara et al. |
| 10,678,184 | B2 | 6/2020 | Murakami et al. |
| 10,901,366 | B2 | 1/2021 | Murakami et al. |
| 10,962,927 | B2 | 3/2021 | Fujiwara et al. |
| 10,969,730 | B2 | 4/2021 | Sueshige et al. |
| 10,983,475 | B2 | 4/2021 | Sueshige et al. |
| 11,169,483 | B2 | 11/2021 | Murakami et al. |
| 11,378,909 | B2 | 7/2022 | Sueshige et al. |
| 11,392,081 | B2 | 7/2022 | Murakami et al. |
| 11,402,798 | B2 | 8/2022 | Murakami et al. |
| 11,449,001 | B2 | 9/2022 | Fujiwara et al. |
| 11,592,766 | B2 | 2/2023 | Ozaki et al. |
| 11,662,673 | B2 | 5/2023 | Ozaki et al. |
| 11,703,794 | B2 | 7/2023 | Matsumaru et al. |
| 11,720,055 | B2 | 8/2023 | Murakami et al. |
| 11,803,153 | B2 | 10/2023 | Murakami et al. |
| 11,809,123 | B2 | 11/2023 | Sueshige et al. |
| 11,822,265 | B2 | 11/2023 | Ozaki et al. |
| 11,906,927 | B2 | 2/2024 | Fujino et al. |
| 11,927,910 | B2 | 3/2024 | Murakami et al. |
| 12,019,392 | B2 | 6/2024 | Murakami et al. |
| 12,025,941 | B2 | 7/2024 | Fujiwara et al. |
| 12,032,330 | B2 | 7/2024 | Fujino et al. |
| 12,038,716 | B2 | 7/2024 | Fujino et al. |
| 12,072,664 | B2 | 8/2024 | Matsumaru et al. |
| 12,072,667 | B2 | 8/2024 | Harada et al. |
| 12,140,884 | B2 | 11/2024 | Ozaki et al. |
| 12,164,260 | B2 | 12/2024 | Yada et al. |
| 12,169,376 | B2 | 12/2024 | Hirayama et al. |
| 2002/0067930 | A1* | 6/2002 | Oguma ................ G03G 21/181 399/222 |
| 2010/0104327 | A1* | 4/2010 | Handa ................ G03G 15/0862 399/263 |
| 2011/0058846 | A1* | 3/2011 | Hirukawa .......... G03G 21/1832 399/106 |
| 2020/0301352 | A1 | 9/2020 | Matsumaru et al. |
| 2023/0032591 | A1 | 2/2023 | Murakami et al. |
| 2023/0176496 | A1 | 6/2023 | Fujino et al. |
| 2023/0418208 | A1 | 12/2023 | Hayashida et al. |
| 2023/0418219 | A1 | 12/2023 | Harada et al. |
| 2023/0418221 | A1 | 12/2023 | Kashiide et al. |
| 2024/0045364 | A1 | 2/2024 | Fujiwara et al. |
| 2024/0045367 | A1 | 2/2024 | Uoo et al. |
| 2024/0272567 | A1 | 8/2024 | Fujino et al. |
| 2024/0272583 | A1 | 8/2024 | Fujino et al. |
| 2024/0295851 | A1 | 9/2024 | Murakami et al. |
| 2024/0411245 | A1 | 12/2024 | Ozaki et al. |
| 2024/0419124 | A1 | 12/2024 | Ishii et al. |
| 2025/0004393 | A1 | 1/2025 | Goto et al. |
| 2025/0013192 | A1 | 1/2025 | Koishi et al. |

FOREIGN PATENT DOCUMENTS

| | | | |
|---|---|---|---|
| JP | 2007-178698 | A | 7/2007 |
| JP | 2009-134035 | A | 6/2009 |
| JP | 2018-189912 | A | 11/2018 |
| JP | 7331220 | B1 | 8/2023 |

OTHER PUBLICATIONS

Co-pending U.S. Appl. No. 18/980,291, filed Dec. 13, 2024.
Co-pending U.S. Appl. No. 19/010,542, filed Jan. 6, 2025.
Co-pending U.S. Appl. No. 19/016,439, filed Jan. 10, 2025.
Co-pending U.S. Appl. No. 19/034,783, filed Jan. 23, 2025.

* cited by examiner (a)

(b)

(a)

(b)

DEVELOPER ACCOMMODATING UNIT WITH STIRRING MEMBER AND VISOR PORTION

FIELD OF THE INVENTION AND RELATED ART

The present invention relates to a developer accommodating unit which accommodates developer and a process cartridge provided with the developer accommodating unit.

In Japanese Patent No. 7331220, it is disclosed that a frame of a developing unit (developing container) is formed by a container frame and a lid portion which are mutually bonded by ultrasonic welding or an adhesive, etc., and that in a toner accommodating chamber inside the frame, a stirring member which stirs toner is disposed.

SUMMARY OF THE INVENTION

An object of the present invention is to provide a developer accommodating unit in which it is less likely for aggregated lump of developer to be generated.

According to an aspect of the present invention, there is provided a developer accommodating unit comprising: a container including a first frame and a second frame mutually bonded so as to constitute an accommodating space for accommodating a developer; and a stirring member configured to stir the developer accommodated in the accommodating space by being rotated in a rotational direction, the stirring member including a rotational shaft and a sheet fixed to the rotational shaft, wherein the first frame includes a recessed portion provided along an edge portion of the first frame and opening toward an upstream side in the rotational direction, and wherein the second frame includes a projecting portion provided along an edge portion of the second frame, projecting toward a downstream side in the rotational direction and engaging with the recessed portion, and so as to prevent the sheet from contacting an end surface, on the upstream side in the rotational direction, of an inner end portion of the recessed portion and including a part of an inner wall constituting the accommodating space, a visor portion provided on a position opposite to the end surface.

Further features of the present invention will become apparent from the following description of exemplary embodiments with reference to the attached drawings.

BRIEF DESCRIPTION OF THE DRAWINGS

Part (a) of FIG. 1 is a cross-sectional view of a developing unit and part (b) of FIG. 1 is an enlarged view of a portion of the developing unit according to an Embodiment 1.

DESCRIPTION OF THE EMBODIMENTS

Hereinafter, Embodiments according to the present invention will be described with reference to the drawings.

Embodiment 1

Figure 2:
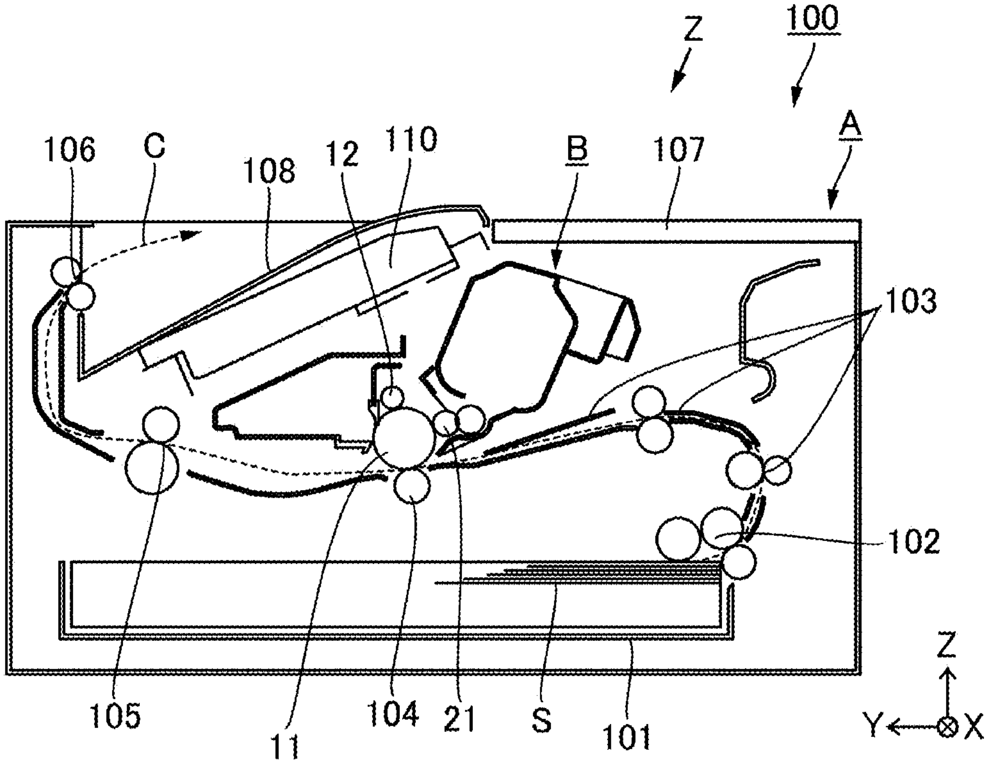
FIG. 2 is a schematic view of a printer according to the Embodiment 1.

FIG. 2 is a cross-sectional view illustrating an outline configuration of a laser beam printer (hereinafter referred to as a "printer 100"), which is an example of an image forming apparatus. The printer 100 forms an image on a sheet S through an electrophotographic process based on image information received from outside. As the sheet S, which is a recording material (recording medium), variety of sheet material of different sizes and material may be used such as, a paper such as a plain paper and a thick paper, sheet material to which a surface treatment is applied such as a coated paper, special shaped sheet material such as an envelope and an index paper, a plastic film and a cloth.

As shown in FIG. 2, the printer 100 is provided with a main assembly A and a process cartridge B. The process cartridge B is capable of mounting and demounting (mountable and demountable) with respect to the main assembly A. Inside the main assembly A, a mounting space (mounting portion), to which the process cartridge B is mounted, is provided. In the present Embodiment, the "main assembly A" refers to a portion of the printer 100 excluding the process cartridge B. Incidentally, the printer 100 may be further provided with a replenishing (supplying) container (toner cartridge), which is mountable and demountable with respect to the main assembly A and replenishes (supplies) toner (developer) to the process cartridge B.

The process cartridge B is an example of an image forming unit (process unit) which forms a toner image through the electrophotographic process using a photosensitive drum 11. The photosensitive drum 11 functions as an image bearing member (electrophotographic photosensitive member) which bears an electrostatic latent image and the toner image. The "process cartridge" refers to a cartridge which is provided with, other than the photosensitive drum 11, at least one process means, which acts onto the photosensitive drum 11 and is integrally mountable and demountable with respect to the main assembly A. The process means is an element which is involved in at least one of each process in the electrophotographic processes (charging, exposure, developing, transfer, fixing, etc.).

The process cartridge B in the present Embodiment is provided with the photosensitive drum 11, a charging roller 12, a developing roller 21, etc. The charging roller 12 is an example of a charging means or a charging device which charges the photosensitive drum 11. The developing roller 21 is an example of a developing means or a developer carrying member which carries and supplies the toner as developer to the photosensitive drum 11. In the description below, an example in which one-component developer including mainly only the toner as the developer will be described, however, two-component developer including the toner and a carrier may also be used as the developer. In addition, the developer may also include, other than the toner, an external additive to adjust fluidity, charging performance, etc. A configuration of the process cartridge B will be described in detail later.

The main assembly A is provided with a sheet accommodating portion 101, a sheet feeding portion 102, a sheet conveyance portion 103, a transfer roller 104, a fixing portion 105, a sheet discharging portion 106, a laser scanner 110, etc.

The sheet accommodating portion 101 (feeding tray, cassette) accommodates the sheet S in a stacked state. The sheet feeding portion 102 is a feeding means which feeds the sheet S one at a time. The sheet feeding portion 102 includes, for example, a pickup roller provided above the sheet accommodating portion 101 and a separating roller pair which separates and conveys the sheet S picked up from the sheet accommodating portion 101. The separating roller pair includes, for example, a conveyance roller which is rotated in a rotational direction along a sheet feeding direction and a separating roller, which forms a separating nip with the conveyance roller and to which driving force in a rotational direction against the sheet feeding direction is input via a torque limiter. The separating roller is an example of a separating member for separating the sheet S with frictional force and, for example, a pad-shaped elastic member (friction pad) may be used as the separating member.

The sheet conveyance portion 103 includes one or more conveyance roller pairs disposed along a sheet conveyance path inside the main assembly A. The transfer roller 104 is an example of a transfer means which transfers the toner image from the photosensitive drum 11 to the sheet S. The transfer roller 104 is in contact with the photosensitive drum 11 and forms a transfer portion (transfer nip) with the photosensitive drum 11 in which the transfer of the toner image is performed.

The fixing portion 105 is an example of a fixing means or a fixing device which fixes the toner image, which is transferred to the sheet S, onto the sheet S. The fixing portion 105 is, for example, a device of film heating type provided with a film having a cylindrical shape, a nip forming portion disposed in an inner space of the film, and a pressing roller which is in contact with an outer surface of the film and nips the film together with the nip forming portion. Between the film and the pressing roller, a nip portion (fixing nip), in which the sheet S is nipped, is formed. The nip forming portion includes, for example, a ceramic heater, in which a pattern of heat generating resistance member is printed on a ceramic substrate, and a holder which holds the ceramic heater. Incidentally, instead of the film having the cylindrical shape, a roller having rigidity (fixing roller) may be used as a fixing member or a heating member. In addition, the heating means which heats the fixing member or the heating member is not limited to the ceramic heater, but may be, for example, a halogen lamp or a coil unit of an induction heating type.

The sheet discharging portion 106 is a discharging means which discharges the sheet S, for which image formation is completed, outside the main assembly A. The sheet discharging portion 106 is, for example, a discharging roller pair which nips and conveys the sheet S.

The laser scanner 110 is an example of an exposure means or an exposure device which performs the exposure of the photosensitive drum 11. The exposure means may be an LED exposure device which uses an LED as a light source instead of an oscillator which emits a laser beam.

In addition, the main assembly A includes an opening portion for mounting and demounting the process cartridge B, an opening/closing door 107 as an opening/closing member for opening/closing the opening portion, and a discharge tray 108 as a stacking portion on which products are stacked. In a state in which the opening/closing door 107 is closed, the opening portion is closed by the opening/closing door 107. In a state in which the opening/closing door 107 is open, a user is permitted to access the process cartridge B in the main assembly A to mount and demount the process cartridge B from outside the main assembly A via the opening portion.

In the description and the drawings below, a vertical direction (direction of gravity) when the printer 100 is installed on a horizontal plane is defined as a Z axis direction. A direction of a rotational axis of the photosensitive drum 11 is defined as an X axis direction. A direction crossing both with the Z axis direction and the X axis direction is defined as a Y axis direction. The X axis direction, the Y axis direction and the Z axis direction are preferably mutually perpendicular to each other. A positive direction and a negative direction of each coordinate axis are denoted with a symbol of + (plus) or − (minus) attached thereto, as needed. For example, the positive direction of the X axis (a direction indicated by an arrow X in Figures) is referred to as a +X side, and the negative direction of the X axis (an opposite side of the arrow X) is referred to as a −X side.

Incidentally, for a portion which is mountable and demountable with respect to the main assembly A such as the process cartridge B, arrangement of components and shapes thereof in triaxial directions, with reference to a state in which the portion is mounted on a predetermined mounting position in the main assembly A, will be described. In other words, positional relationship of elements of the developing unit 20, etc., which will be described below, will be described with reference to an attitude of the developing unit 20 when the process cartridge B is mounted in the main assembly A and the printer 100 performs an image forming operation (when the developing unit 20 performs the development). In other words, the positional relationship of the elements of the developing unit 20, etc. will be described with reference to when the developing unit 20 takes an attitude of being mounted to the main assembly A of the image forming apparatus.

In the present Embodiment, the sheet S, to which the image is formed in the main assembly A, is discharged toward a −Y side in the Y axis direction by the sheet discharging portion 106. The −Y side is a front side of the printer 100 according to the present Embodiment, and a +Y side is a rear side of the printer 100 according to the present Embodiment.

(Image Forming Operation)

Next, a series of operations (image formation operation, print operation), in which the printer 100 forms the image onto the sheet S while conveying the sheet S, will be described.

A control portion of the printer 100 starts execution of the image forming operation based on an instruction from a user (print instruction). First, the sheet S accommodated in the sheet accommodating portion 101 is fed one at a time by the sheet feeding portion 102, and conveyed along the sheet conveyance path (a broken line C in FIG. 2) by the sheet conveyance portion 103.

When the sheet S is conveyed to a predetermined position on an upstream side of the transfer portion, the control portion transmits a start signal of the image formation. Based on the start signal of the image formation, formation process of the toner image using the photosensitive drum 11 is initiated. Specifically, the photosensitive drum 11 is rotationally driven by a driving source (motor) of the main assembly A, and a surface of the photosensitive drum 11 is uniformly charged to predetermined potential by the charging roller 12. The laser scanner 110 irradiates and exposes the photosensitive drum 11 with the laser beam based on the image information to form the electrostatic latent image on the surface of the photosensitive drum 11. The developing roller 21 supplies the toner to the photosensitive drum 11 in an opposing portion (developing portion) between the developing roller 21 and the photosensitive drum 11 to develop the electrostatic latent image into the toner image. As a result, the electrostatic latent image is visualized as the toner image on the photosensitive drum 11.

While the sheet S, which is conveyed by the sheet conveyance portion 103, passes through the transfer portion, the toner image is transferred from the photosensitive drum 11 to the sheet S by the transfer roller 104, to which transfer voltage is applied. The sheet S, which passed through the transfer portion, is conveyed to the fixing portion 105. The fixing portion 105 fixes the toner image onto the sheet S by heating and pressing the toner image on the sheet S while conveying the sheet S in the fixing nip portion. The sheet S, which passed through the fixing portion 105, is discharged by the sheet discharging portion 106 to the discharge tray 108 and stacked.

(Process Cartridge)

Figure 3:
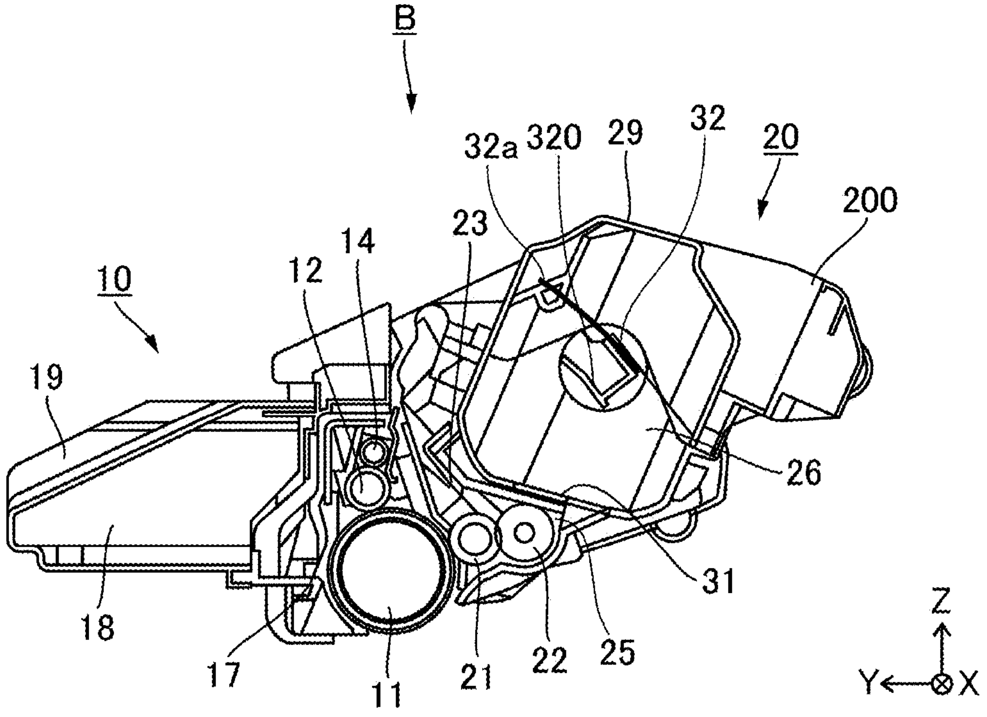
FIG. 3 is a cross-sectional view of a process cartridge according to the Embodiment 1.
Figure 4:
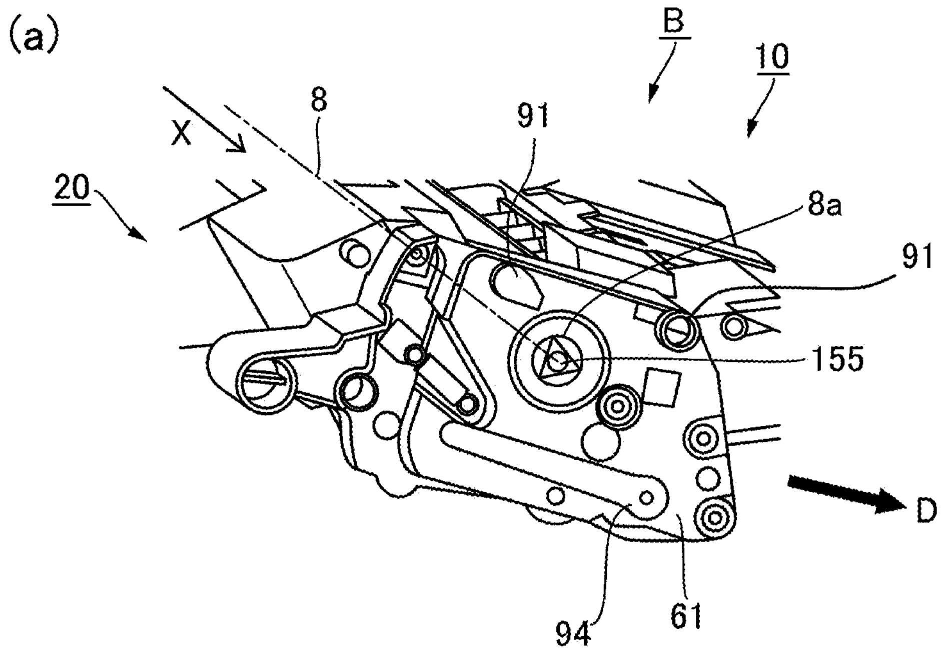
FIG. 4, part (a) and pard (b), includes explanatory views of the process cartridge according to the Embodiment 1.
Figure 4:
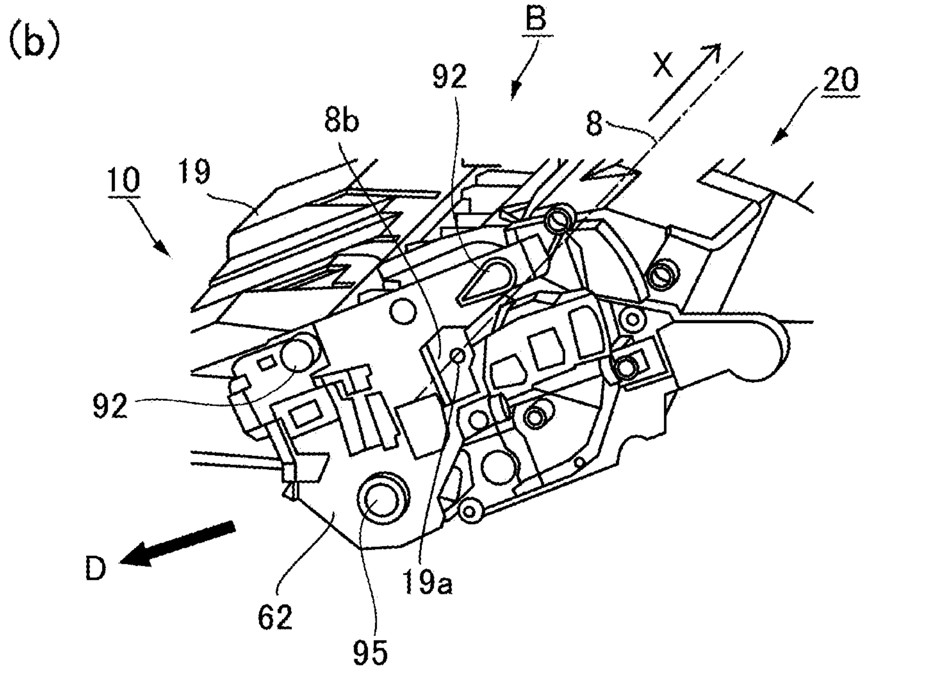

The process cartridge B will be described using FIG. 3 and part (a) and part (b) of FIG. 4. FIG. 3 is a cross-sectional view of the process cartridge B in an imaginary plane perpendicular to the X axis direction. Part (a) of FIG. 4 is a perspective view of an end portion on one side in the X axis direction (+X side) of the process cartridge B. Part (b) of FIG. 4 is a perspective view of an end portion on the other side in the X axis direction (−X side) of the process cartridge B.

To the end portion on the +X side of the process cartridge B, a drive inputting portion 155, which receives driving force from the main assembly A, is provided. Therefore, in the description below, the +X side may be referred to as a "driving side" and the −X side as a "non-driving side".

As shown in FIG. 3, the process cartridge B includes, roughly, a drum unit 10 (photosensitive member unit, cleaning unit) and a developing unit 20.

The drum unit 10 includes the photosensitive drum 11, the charging roller 12, a charger cleaner 14, a cleaning blade 17 and a drum unit frame 19. Inside the drum unit frame 19, a waste toner accommodating chamber 18 is provided.

The charging roller 12 is disposed so as to contact an outer peripheral surface of the photosensitive drum 11. The charging roller 12 charges the photosensitive drum 11 with application of voltage from a high voltage substrate of the main assembly A. The cleaning blade 17 is a member which has elasticity and is disposed so as to contact the outer peripheral surface of the photosensitive drum 11. The cleaning blade 17 cleans the surface of the photosensitive drum 11 as the photosensitive drum 11 is rotated. The toner (waste toner) removed from the photosensitive drum 11 by the cleaning blade 17 is accommodated in the waste toner accommodating chamber 18. The charger cleaner 14 is disposed so as to contact the outer peripheral surface of the charging roller 12. The charger cleaner 14 cleans the surface of the charging roller 12.

The developing unit 20 includes the developing roller 21, a supplying roller 22, a developing blade 23, a developing container 29 and a stirring member 32. The developing unit 20 is an example of a developer accommodating unit which accommodates the developer.

The developing container 29 is a frame (developing unit frame) in which a toner accommodating portion, in which the toner as the developer is accommodated, is formed. To the developing container 29, a toner accommodating chamber 26 as an accommodating chamber (developer accommodating portion), which accommodates the developer, and a developing chamber 25 as a supplying chamber, which supplies the toner to the developing roller 21, are provided. In addition, to the developing container 29, a communication opening 31, which communicates with the toner accommodating chamber 26 and the developing chamber 25, is provided.

For each of the developing roller 21 and the supplying roller 22, both end portions in the X axis direction are supported by the developing container 29 and each roller is rotated about a rotational axis thereof extending in the X axis direction, respectively. The developing roller 21 and the supplying roller 22 are disposed in the developing chamber 25. In addition, a portion of an outer peripheral surface of the developing roller 21 is exposed to an outside of the developing container 29 through an opening, which is provided to the developing container 29, and opposing to the outer peripheral surface of the photosensitive drum 11. The developing roller 21 carries the toner and is rotated to supply the toner to the opposing portion to the photosensitive drum 11 (developing portion). The supplying roller 22 supplies the toner in the developing chamber 25 to the developing roller 21.

The developing blade 23 is disposed so as to contact the outer peripheral surface of the developing roller 21. The developing blade 23 regulates a thickness of the toner carried by the developing roller 21 and supplied to the developing portion, and applies triboelectric charging thereto by rubbing the toner.

The stirring member 32 is disposed in the toner accommodating chamber 26. The stirring member 32 includes a rotational shaft 320, which is rotated about a rotational axis A1 extending in the X axis direction, and a sheet member (elastic sheet 32*a*), which is supported by the rotational shaft 320. The elastic sheet 32*a* is formed of resin sheet material having flexibility (elasticity). The stirring member 32 is rotationally driven about the rotational axis A1 extending in the X axis direction by the driving force input to the process cartridge B from the main assembly A, and stirs the toner in the toner accommodating chamber 26 with the elastic sheet 32*a*. In addition, the stirring member 32 conveys the toner in the toner accommodating chamber 26 to the developing chamber 25 with the elastic sheet 32*a*.

In the present Embodiment, the direction of the rotational axis of the stirring member 32 is substantially the same as the X axis direction, except for unavoidable errors such as component tolerances. Therefore, positional relationship between elements in the X axis direction and the cross section in the imaginary plane perpendicular to the X axis direction hereinafter can be read as positional relationship between elements in the direction of the rotational axis of the stirring member 32 and a cross section in an imaginary plane perpendicular to the direction of the rotational axis of the stirring member 32, respectively.

Support of the developing unit 20 by the drum unit 10 will be described. As shown in part (a) and part (b) of FIG. 4, the developing unit 20 is movably connected to the drum unit 10. Specifically, the developing unit 20 is, with respect to the drum unit 10, swingable (rotatable) about a swing axis 8 extending in the direction of the rotational axis of the developing roller 21 (the X axis direction) (FIG. 3). The swing axis 8 is an imaginary straight line which includes supporting shafts 8*a* and 8*b*, which is provided at both end portions of the developing unit 20 in the X axis direction.

The developing unit 20 is movable to a contact position, in which the developing roller 21 is in contact with the photosensitive drum 11, and to a separated position, in which the developing roller 21 is separated from the photosensitive drum 11. The developing unit 20 is urged toward the contact position by a spring member, which is provided on the driving side and the non-driving side, respectively.

The drum unit 10 includes a side cover on the driving side 61, which forms an end surface on the driving side (+X side) of the drum unit frame 19, and a side cover on the non-driving side 62, which forms an end surface of the non-driving side (−X side) of the drum unit frame 19. To each of the side cover on the driving side 61 and the side cover on the non-driving side 62, guided portions 91, 92, 94 and 95, which are guided by guide members 114, 115 of the main assembly A, which will be described below, upon mounting and demounting of the process cartridge B, are provided, respectively. The guided portions 91, 94 are projecting portions projecting from an end surface on the +X side of the side cover on the driving side 61 to the +X side. The guided portions 92, 95 are projecting portions projecting from an end surface of the −X side of the side cover on the non-driving side 62 to the −X side.

(A Mounting and Demounting Method of the Process Cartridge)

Next, a mounting and demounting method of the process cartridge B with respect to the main assembly A will be described using part (a) and part (b) of FIG. 5. Part (a) and part (b) of FIG. 5 are explanatory views illustrating the mounting and demounting method of the process cartridge B with respect to the main assembly A.

Figure 5:
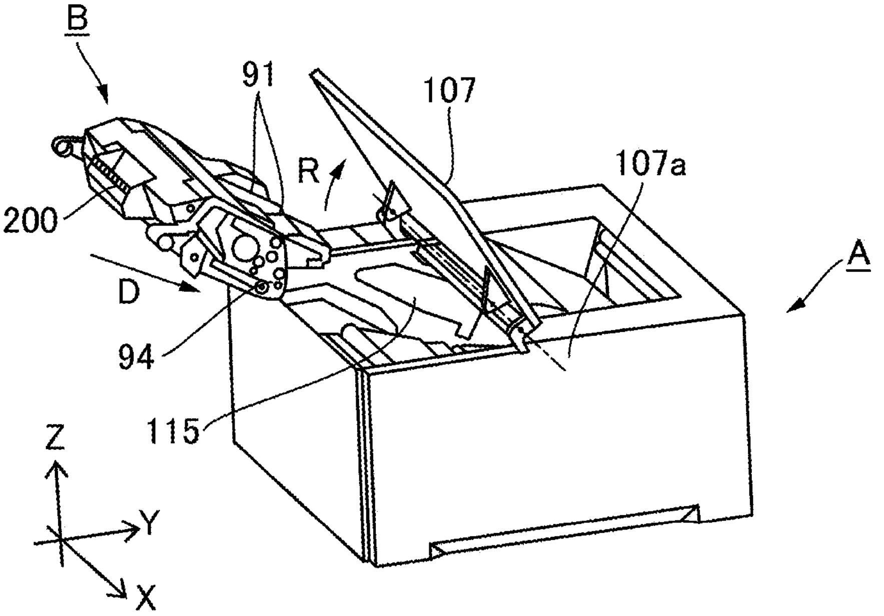
FIG. 5, part (a) and part (b), includes explanatory views illustrating a mounting and demounting method of the process cartridge according to the Embodiment 1.
Figure 5:
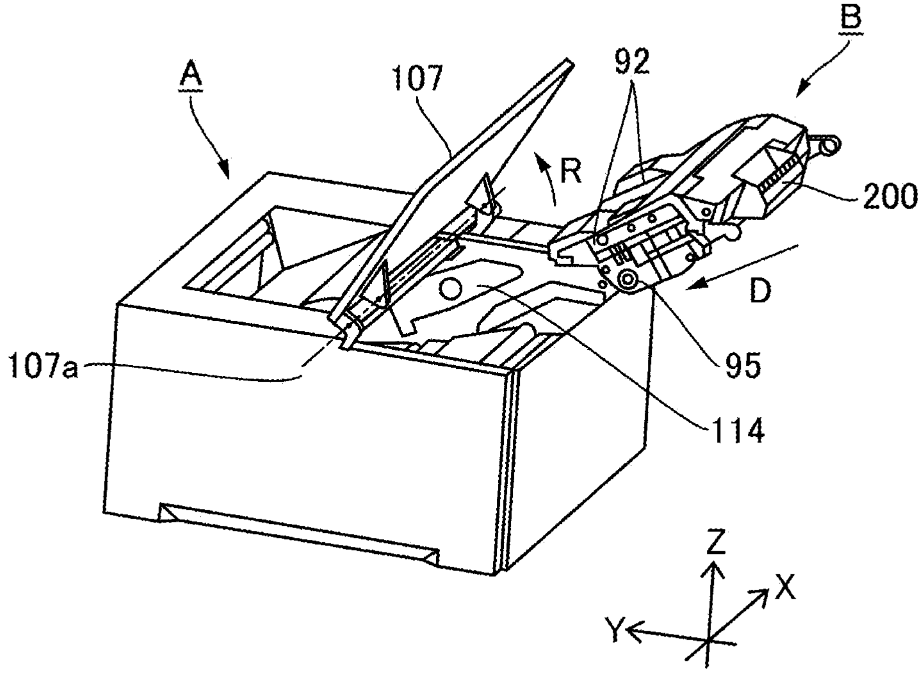

As shown in part (a) and part (b) of FIG. 5, upon performing the mounting and demounting of the process cartridge B, a user exposes the opening portion of the main assembly A by opening the opening/closing door 107. The opening/closing door 107 is opened by being operated rotationally in a direction of an arrow R about a rotational axis 107*a* extending in the X axis direction.

The user grips a grip portion 200 of the process cartridge B and inserts the process cartridge B into the main assembly A along a mounting direction D. Upon the insertion, a moving direction and an attitude of the process cartridge B is restricted by the guide members 114, 115 provided to the main assembly A. The guide member 114 on the +X side (part (b) of FIG. 5) guides the guided portions 91, 94 provided on the side cover on the driving side 61 of the process cartridge B (part (a) of FIG. 5 and part (a) of FIG. 4). The guide member 115 on the −X side (part (a) of FIG. 5) guides the guided portions 92, 95 provided on the side cover on the non-driving side 62 of the process cartridge B (part (b) of FIG. 5 and part (b) of FIG. 4).

When the process cartridge B reaches a predetermined mounting completed position, the process cartridge B is positioned by the guided portions 94, 95 being abutted to an abutting portion of the main assembly A. Then, by the opening/closing door 107 being closed, the mounting of the process cartridge B is completed. The mounting completed position is a position in which the printer 100 becomes capable of performing the image forming operation using the process cartridge B.

An operation to demount (detach) the process cartridge B from the main assembly A is performed through reverse procedure to the above. That is, after opening the opening/closing door 107, a user grips the process cartridge B and pulls the process cartridge B out to an opposite side to the mounting direction D. Upon pulling out, a moving direction and an attitude of the process cartridge B is restricted by the guide members 114, 115 provided to the main assembly A.

(Details on the Developing Container)

Figure 6:
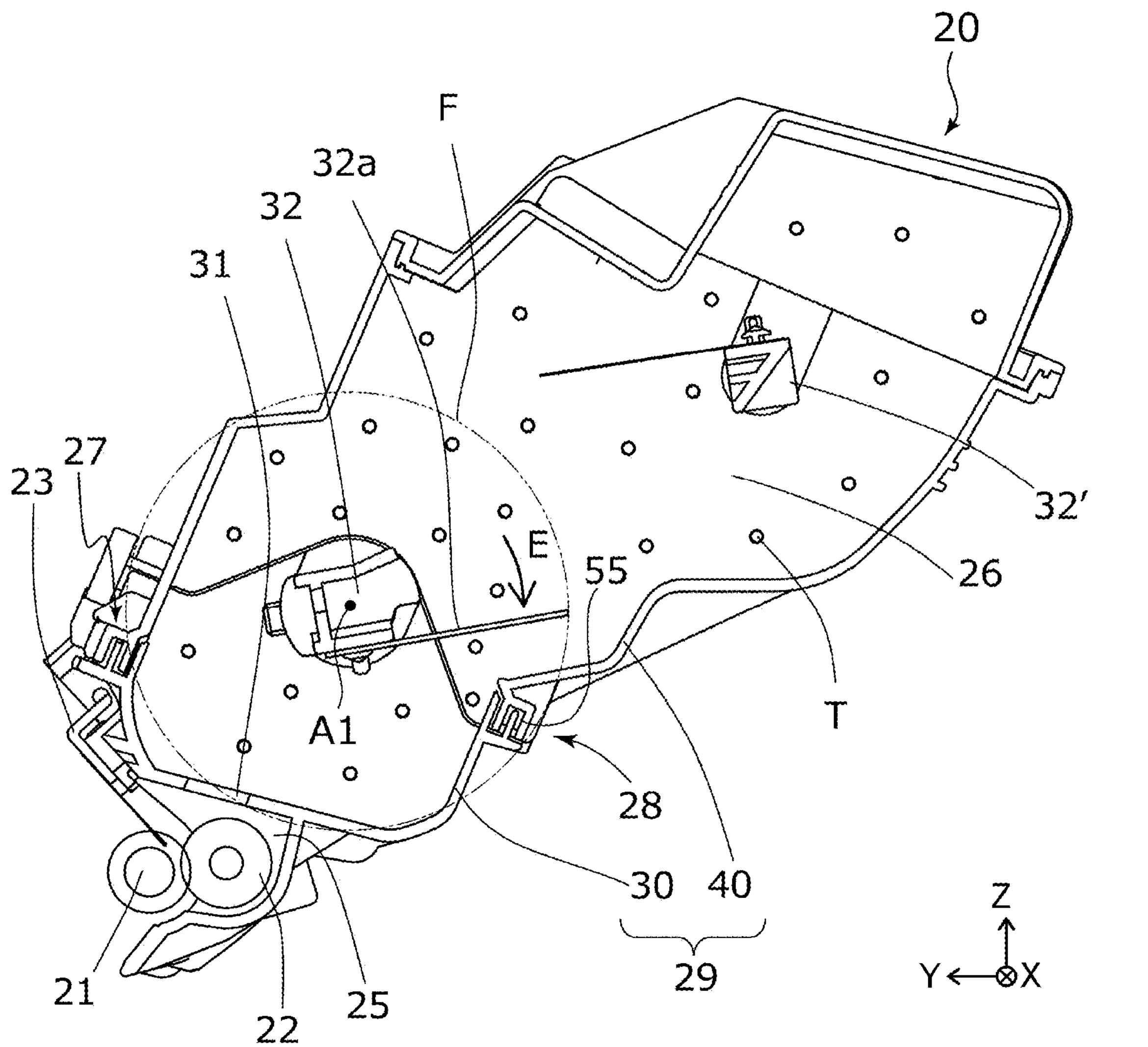
FIG. 6 is a cross-sectional view of the developing unit according to the Embodiment 1.

Next, details on the developing container 29 in the present Embodiment will be described using FIG. 6. FIG. 6 is a cross-sectional view of the developing unit 20 in the imaginary plane perpendicular to the X axis direction.

As shown in FIG. 6, the developing container 29 includes a first frame 30 and a second frame 40. The developing chamber 25 is formed by the first frame 30. The toner accommodating chamber 26 is formed by the first frame 30 and the second frame 40. The developing container 29 is elongated in the X axis direction. In other words, the X axis direction is a longitudinal direction of the developing container 29 (longitudinal direction of the developing unit 20).

The second frame 40 is disposed on an upper side in the direction of gravity (+Z side) of the first frame 30 in an image forming attitude of the process cartridge B. In other words, at least a part of the second frame 40 is disposed above an uppermost portion of the first frame 30 in the image forming attitude of the process cartridge B. The image forming attitude refers to an attitude of the process cartridge B in a state in which the process cartridge B is mounted on the mounting completed position in the main assembly A and the printer 100 is capable of performing the image forming operation.

The first frame 30 and the second frame 40 are bonded at bonding portions 27, 28 by a bonding method such as adhesion. The bonding methods may include, for example, adhesion using an adhesive, ultrasonic welding or mechanical bonding such as snap-fitting or screwing, but are not limited thereto. As the adhesive, for example, a hot melt adhesive (thermoplastic resin) may be used.

In the toner accommodating chamber 26, a boundary between the first frame 30 and the second frame 40 in the bonding portions 27, 28 is exposed. In the bonding portions 27, 28, a sealing portion 55, which seals a gap between the first frame 30 and the second frame 40, is formed. By the sealing portion 55, it becomes possible to prevent the toner from spilling out of the toner accommodating chamber 26 to an outside of the developing container 29.

The sealing portion 55 is, for example, an adhesive layer formed by the adhesive. In a case in which the welding is used as the bonding method, the sealing portion 55 may be a portion in which resin material of the first frame 30 and resin material of the second frame 40 are melted together by the welding. In a case in which the mechanical bonding is used as the bonding method, the sealing portion 55 may be a contact surface in which a surface of the first frame 30 and a surface of the second frame 40 are contacted closely, or a seal member such as a rubber packing disposed between the surface of the first frame 30 and the surface of the second frame 40.

The developing chamber 25 is disposed below in the direction of gravity with respect to the toner accommodating chamber 26. The developing chamber 25 is disposed at a lower end portion of the entire developing unit 20. In a lower portion of the first frame 30, the communication opening 31, which communicates with the toner accommodating chamber 26 and the developing chamber 25, is formed. The toner in the toner accommodating chamber 26 is supplied to the developing chamber 25 via the communication opening 31.

The aforementioned stirring member 32 is rotatably supported by either one of the first frame 30 or the second frame 40. The developing unit 20 may include another stirring member 32', which is rotatably supported by the other of the first frame 30 and the second frame 40. In addition, the developer container 29 may include a different frame member than the first frame 30 and the second frame 40.

(Locking Mechanism)

Figure 7:
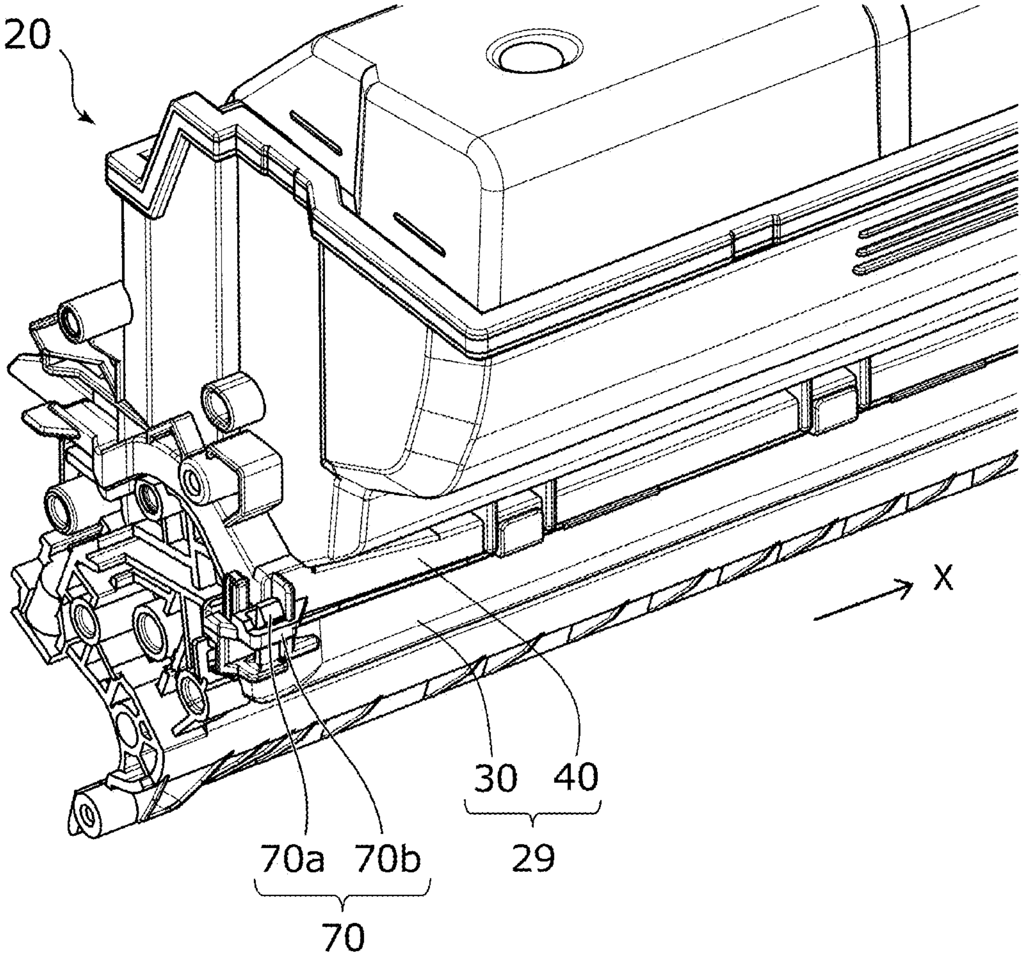
FIG. 7 is an explanatory view of a locking mechanism of a developing frame according to the Embodiment 1.
Figure 8:
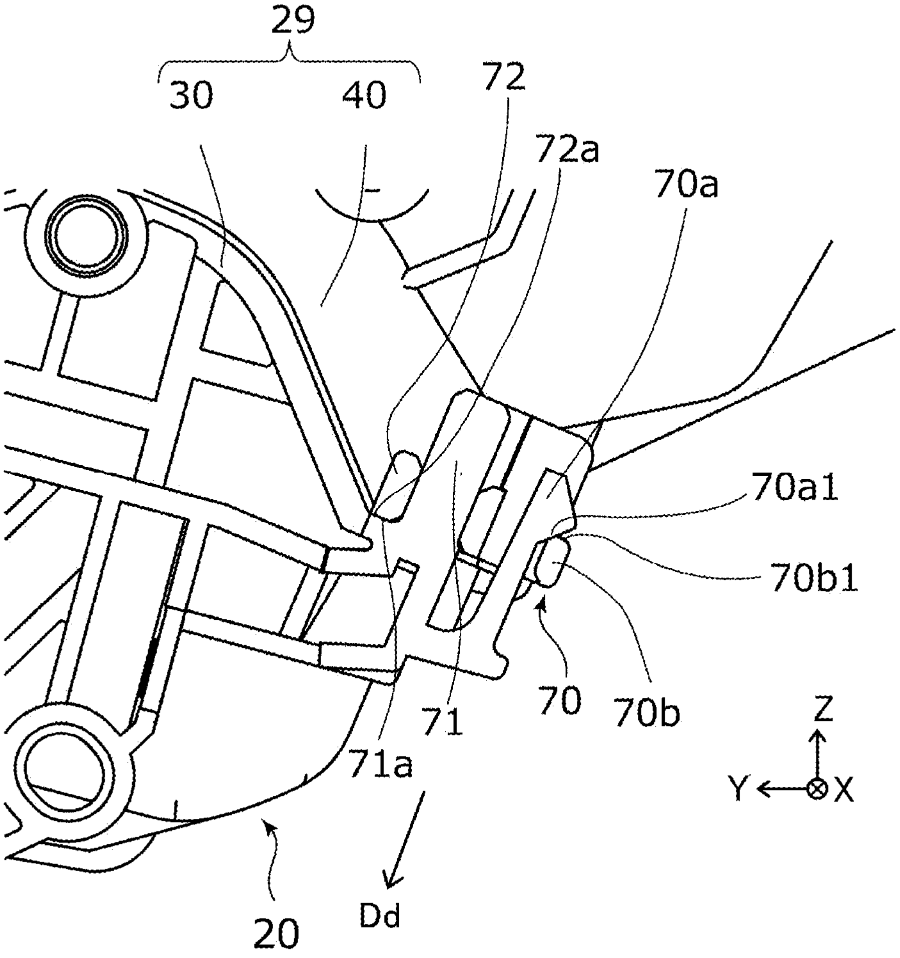
FIG. 8 is an explanatory view of the locking mechanism of the developing frame according to the Embodiment 1.

A locking mechanism 70 which mutually locks the first frame 30 and the second frame 40 will be described using FIG. 7 and FIG. 8. FIG. 7 is a perspective view of the developing unit 20 illustrating the locking mechanism 70. FIG. 8 is a cross-sectional view of the developing unit 20 in the imaginary plane perpendicular to the X axis direction.

As shown in FIG. 7, the locking mechanism 70 is provided at an end portion of the developing container 29 in the X axis direction (longitudinal direction). The locking mechanism 70 may be provided at both end portions of the developing container 29 in the X axis direction (longitudinal direction). In addition, the locking mechanism 70 may be provided in a portion other than the end portion of the developing container 29 in the X axis direction (longitudinal direction) (e.g., in a central portion).

As shown in FIG. 7 and FIG. 8, the locking mechanism 70 includes an engaging claw 70*a* and an engaged portion 70*b*, which is engaged by the engaging claw 70*a*. One of the engaging claw 70*a* and the engaged portion 70*b* is provided to the first frame 30, and the other of the engaging claw 70*a* and the engaged portion 70*b* is provided to the second frame 40. In the present Embodiment, the engaging claw 70*a* is provided to the first frame 30 and the engaged portion 70*b* is provided to the second frame 40, however, the engaged portion 70*b* may be provided to the first frame 30 and the engaging claw 70*a* may be provided to the second frame 40. The engaging claw 70*a* and a portion of the first frame 30 other than the engaging claw 70*a* may be integrally molded by injection molding, etc., using common resin material. The engaged portion 70*b* and a portion of the second frame 40 other than the engaged portion 70*b* may be integrally molded by injection molding, etc., using common resin material.

The engaging claw 70*a* is inserted into a hole portion of the engaged portion 70*b*, and a tip 70*a*1 of the engaging claw 70*a* is being hooked on an end surface 70*b*1 of the engaged portion 70*b*. By the mechanical engagement between the engaging claw 70*a* and the engaged portion 70*b*, separation of the first frame 30 and second frame 40 is restricted. Specifically, the first frame 30 is restricted to move, with respect to the second frame 40, in a disengaging direction Dd (FIG. 8), in which the engaging claw 70*a* is disengaged from the engaged portion 70*b*.

The first frame 30 and the second frame 40 are positioned with each other, for example, by a positioning projection 71 (projecting portion) provided to the first frame 30 being inserted into a positioning hole 72 (hole portion) provided to the second frame 40. By the engagement between the positioning projection 71 and the positioning hole 72, a relative movement between the first frame 30 and the second frame 40 in a direction crossing a center line of the positioning projection 71 is restricted. In addition, by an abutting surface 71*a* at a base of the positioning projection 71 being abutted to an abutting surface 72*a* around the positioning hole 72, a position of the first frame 30 in an inserting direction of the positioning projection 71 with respect to the positioning hole 72 is determined. A similar positioning mechanism is provided to an end portion on the other side (+X side) in the longitudinal direction of the developing unit 20. Incidentally, the positioning projection 71 (projecting portion) may be provided to the second frame 40 and the positioning hole 72 (hole portion) may be provided to the first frame 30.

The disengaging direction Dd is a direction in which the gap (gap in which the sealing portion 55 is formed by the adhesive) between a free end of a third rib 37 of the first frame 30 and a second flange portion 43 of the second frame 40 (part (a) and part (b) of FIG. 1), which will be described below, is widened. Thus, the locking mechanism 70 can restrict that the first frame 30 and the second frame 40 do the relative movement in the direction in which the gap between the first frame 30 and the second frame 40 is widened. In addition, by the engagement between the engaging claw 70*a* and the engaged portion 70*b*, the first frame 30 and the second frame 40 are positioned with each other in a state in which the third rib 37 of the first frame 30 (part (b) of FIG. 1) is accommodated inside a recessed shape 54 of the second frame 40.

By the first frame 30 being held in a predetermined bonding completed position with respect to the second frame 40 by the locking mechanism 70, it becomes possible to prevent positional misalignment between the first frame 30 and the second frame 40 from occurring before the adhesive cures.

In particular, in a case in which the hot melt adhesive is used as the adhesive, the first frame 30 or the second frame 40 may be deformed due to heat from the hot melt adhesive. In this case, by an engagement depth of the third rib 37 (part (b) of FIG. 1) to the recessed shape 54, which will be described below, becoming shallow, adhesive strength may become insufficient. In addition, the adhesive may cure in a state in which the abutting surfaces 71*a*, 72*a* of the first frame 30 and the second frame 40 (FIG. 8) are separated. In the present Embodiment, a state in which the first frame 30 and the second frame 40 are positioned by the locking mechanism 70 is maintained in a state in which the third rib 37 is engaged with the recessed shape 54 at a predetermined engagement depth and the abutting surfaces 71*a*, 72*a* of the first frame 30 and the second frame 40 are in contact with each other. Therefore, according to the present Embodiment, even in the case in which the hot melt adhesive is used, it becomes possible to reduce a possibility that the adhesive strength between the first frame 30 and the second frame 40 is decreased, and improve positioning accuracy between the first frame 30 and the second frame 40.

(Details on the Bonding Portion)

Next, details on the bonding portion 28 of the developing container 29 in the present Embodiment will be described using part (a) and part (b) of FIG. 1. Part (a) of FIG. 1 is a cross-sectional view of the developing unit 20 in the imaginary plane perpendicular to the X axis direction (direction of the rotational axis of the stirring member 32). Part (b) of FIG. 1 is an enlarged view in which a portion of part (a) of FIG. 1 is enlarged.

Figure 1:
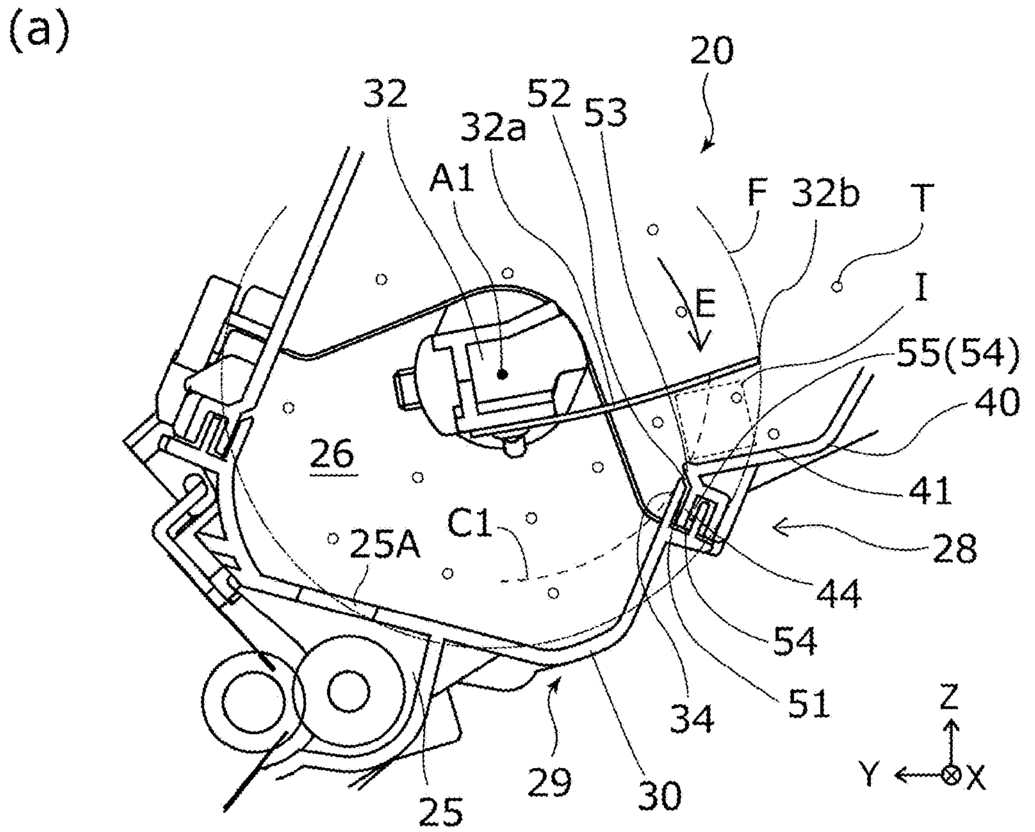
Figure 1:
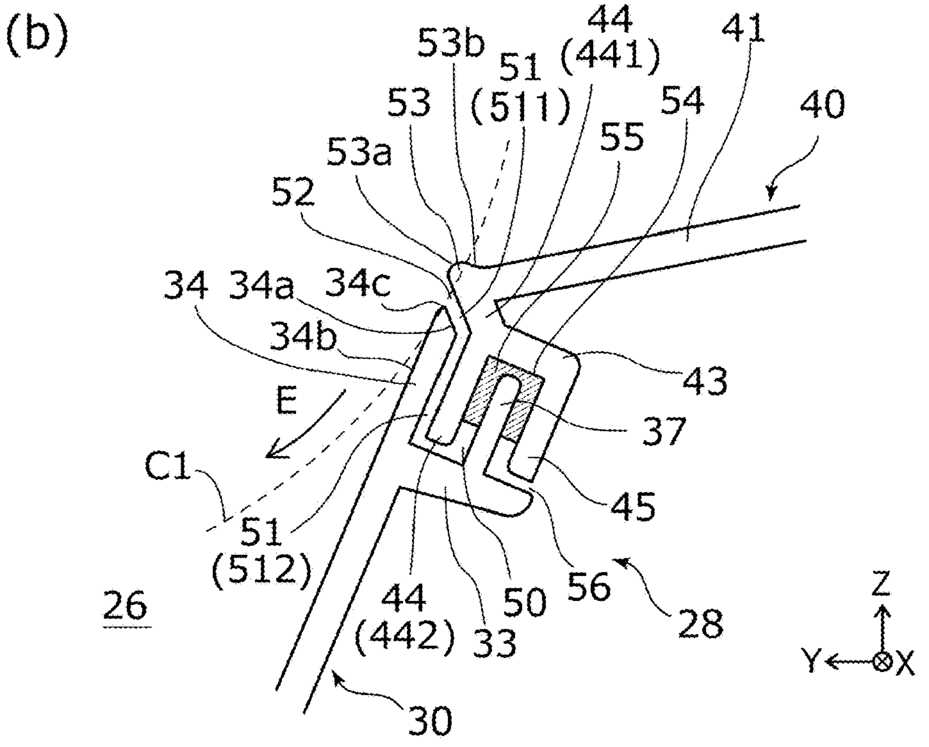

As shown in part (a) and part (b) of FIG. 1, the first frame 30 includes a first rib 34 (first projecting portion), a first flange portion 33 and the third rib 37 (third projecting portion). The second frame 40 includes a second rib 44

(second projecting portion), the second flange portion 43 and a fourth rib 45 (fourth projecting portion).

By the first rib 34, the first flange portion 33 and the third rib 37, a recessed portion provided along an edge portion of the first frame 30 and opening toward an upstream side in a rotational direction E of the stirring member 32 is formed. The first rib 34 is an inner end portion of the recessed portion and including a part of an inner wall constituting an accommodating space (toner accommodating chamber 26). The second rib 44 is a projecting portion provided along an edge portion of the second frame 40, projecting toward a downstream side in the rotational direction E and engaging with the recessed portion.

In addition, a gap portion 50 is formed between the first frame 30 and the second frame 40. The gap portion 50 includes a first opening portion 52 which opens to an inner space of the developing container 29 (toner accommodating chamber 26) and a second opening portion 56 which is opens to an outer space of the developing container 29. A groove portion 51, which will be described below, is a portion of the gap portion 50 and is a gap formed between a surface of the first rib 34 (inner end portion of the recessed portion) on a side opposite to the toner accommodating chamber 26 and a surface of the second rib 44 facing the toner accommodating chamber 26. The groove portion 51 includes the opening portion 52.

The sealing portion 55 seals at least a portion of the gap portion 50 from the inner opening portion 52 to the outer opening portion 56 in the cross-section perpendicular to the X axis direction. By the sealing portion 55 being provided between the inner opening portion 52 and the outer opening portion 56 of the gap portion 50, it becomes possible to prevent the toner from spilling out from the inside to the outside of the developing container 29 via the gap portion 50.

The bonding portion 28 in the present Embodiment includes the first rib 34, the first flange portion 33, the third rib 37, the second rib 44, the second flange portion 43, the fourth rib 45, the gap portion 50 and the sealing portion 55.

The first rib 34 is a part of a peripheral wall of the first frame 30 which forms the toner accommodating chamber 26. In other words, one side surface of the first rib 34 (a surface on the +Y side in part (a) and part (b) of FIG. 1) is facing to the toner accommodating chamber 26. The first rib 34 extends from a base portion of the first flange portion 33 toward the upstream side in the rotational direction E of the stirring member 32 centered on the rotational axis A1 of the stirring member 32. The first rib 34 in the present Embodiment is disposed on the −Y side with respect to the rotational axis A1 of the stirring member 32, and an end surface 34*a* of the first rib 34 extends toward the +Z side in the Z axis direction. On the other hand, the rotational direction E of the stirring member 32 is a direction toward the −Z side in the Z axis direction (clockwise direction in FIG. 1) in the −Y side with respect to the rotational axis A1.

The first flange portion 33 is projecting toward the outside of the developing container 29 against the peripheral wall of the first frame 30, which forms the toner accommodating chamber 26. The first flange portion 33 in the present Embodiment extends from the base portion (a diverging portion from the first rib 34 (the base portion of the first flange portion 33)) toward a tip of the first flange portion 33, approximately in the −Y side.

The third rib 37 is provided between the tip and the base portion of the first flange portion 33 and extends toward the upstream side in the rotational direction E of the stirring member 32. The third rib 37 in the present Embodiment extends approximately parallel to the first rib 34.

The second rib 44 projects toward the outside of the developing container 29 against the peripheral wall of the second frame 40, which forms the toner accommodating chamber 26, and, furthermore, extends toward the downstream side in the rotational direction E of the stirring member 32. The second rib 44 in the present Embodiment includes a first part 441 projecting toward the outside of the developing container 29 against the peripheral wall of the second frame 40, which forms the toner accommodating chamber 26, and a second part 442 extending toward the downstream side in the rotational direction E of the stirring member 32 from a tip of the first part 441. In the present Embodiment, the second rib 44 has a shape, which is bent between the first part 441 and the second part 442. Not limited thereto, however, the second rib 44 may, for example, extend in a direction toward the outside of the developing container 29 against the peripheral wall of the second frame 40, which forms the toner accommodating chamber 26, and along a straight line extending in a direction of the downstream side in the rotational direction E.

The second rib 44 in the present Embodiment extends from a slope portion 41 (wall surface portion), which forms the inner wall of the toner accommodating chamber 26 on the upstream side of the opening portion 52 in the rotational direction E of the stirring member 32, toward the downstream side in the rotational direction E. The first part 441 of the second rib 44 projects to the downside (−Z side) with respect to the slope portion 41, which is provided in a downstream portion of the second frame 40 in the rotational direction E of the stirring member 32. The extending direction of the second part 442 of the second rib 44 and the extending direction of the first rib 34 are approximately parallel. The second part 442 of the second rib 44 is positioned inside the recessed shape 54 formed by the first rib 34, the first flange portion 33 and the third rib 37 of the first frame 30. The recessed shape 54 is a groove shape having a U-shaped cross-sectional shape opening toward the upstream side of the rotational direction E and extending in the direction of the rotational axis of the stirring member 32 (X axis direction).

The second flange portion 43 diverges from the second rib 44 and projects toward the outside of the developing container 29. The second flange portion 43 extends from the diverging portion from the second rib 44 to the −Z side and the −Y side, toward a tip of the second flange portion 43.

Between the first rib 34 and the second rib 44, the groove portion 51, which includes the opening portion 52 opening toward the toner accommodating chamber 26, is formed. The groove portion 51 is a part of the gap portion 50. The groove portion 51 extends from the opening portion 52 toward the downstream side in the rotational direction E of the stirring member 32.

The groove portion 51 in the present Embodiment includes a first part 511, which is formed between a tip portion of the first rib 34 and the first part 441 of the second rib 44, and a second part 512, which is formed between a surface on the −Y side (outside surface) of the first rib 34 and the second part 442 of the second rib 44. The first part 511 of the groove portion 51 includes the opening portion 52. At least the first part 511 of the groove portion 51 extends toward the downstream side in the rotational direction E of the stirring member 32. In the present Embodiment, the groove portion 51 is bent between the first part 511 and the second part 512.

The fourth rib 45 is provided at the tip of the second flange portion 43 and extends toward the downstream side in the rotational direction E of the stirring member 32. The extending direction of the fourth rib 45 and the extending direction of the second rib 44 are approximately parallel.

The aforementioned third rib 37 of the first frame 30 is positioned inside the recessed shape 54, which is formed by the second rib 44, the second flange portion 43 and the fourth rib 45 of the second frame 40. The sealing portion 55 is provided, in the gap portion 50, at a portion in which the recessed shape 54 and the third rib 37 are opposing to each other.

The third rib 37, the second rib 44, the second flange portion 43 and the fourth rib 45 are provided over an entire length of the toner accommodating chamber 26 (approximately an entire length of the developing container 29) in the longitudinal direction of the developing unit 20 (X axis direction). By this, the sealing portion 55 is formed over the entire length of the toner accommodating chamber 26 and it becomes possible to prevent the toner from spilling out of the developing container 29 via the bonding portion 28.

On the other hand, the first rib 34 may be provided in a range which includes at least a central position of the toner accommodating chamber 26 in the longitudinal direction of the developing unit 20 (X axis direction). A length of the first rib 34 in the X axis direction may be shorter than the entire length of the toner accommodating chamber 26 or a length of the elastic sheet 32*a* of the stirring member 32. This is because, as described below, the first rib 34 is what functions as a guide upon combining the first frame 30 and the second frame 40. In other words, the first rib 34 may be disposed so as to be guided by the second rib 44 in a central portion of the toner accommodating chamber 26, which is away from the positioning projection 71 and the positioning hole 72 (FIG. 8) provided on both end portions of the developing container 29 in the longitudinal direction.

An example of a procedure in a case in which the first frame 30 and the second frame 40 are bonded using the adhesive will be described. First, the adhesive is applied inside the recessed shape 54 of the second frame 40, which is formed by the second rib 44, the second flange portion 43 and the fourth rib 45. Next, the first frame 30 is combined to the second frame 40 so that the third rib 37 enters inside the recessed shape 54. Upon combining, by the first rib 34 being guided by a surface on the +Y side of the second rib 44, a position of the first frame 30 relative to the second frame 40 is restricted so that the third rib 37 more securely enters inside the recessed shape 54 of the second frame 40. By the third rib 37 pushing and spreading the adhesive, the tip of the third rib 37 and the second flange portion 43, one side surface of the third rib 37 and the second rib 44, and the other side surface of the third rib 37 and the fourth rib 45 are adhered via the adhesive, respectively. In other words, the third rib 37 is adhered to an inner surface of the recessed shape 54.

Thereafter, when the first frame 30 is moved to the predetermined bonding completed position with respect to the second frame 40, the position of the first frame 30 with respect to the second frame 40 is determined by the locking mechanism 70 described above. And, by the adhesive curing in the state in which the first frame 30 and the second frame 40 are positioned, the bonding of the first frame 30 and the second frame 40 is completed.

In other words, the first rib 34 functions as a guide shape, which is guided by the second frame 40 so that adhered portions of the first frame 30 and the second frame 40 (the third rib 37 and the recessed shape 54) are more securely opposed to each other upon combining the first frame 30 and second frame 40. The first rib 34 in the present Embodiment is guided by the second rib 44, which forms a side wall portion of the recessed shape 54. Incidentally, by configuring the end surface 34*a* of the first rib 34 to have a tapered surface, which is inclined to a side going away from the second rib 44 in a moving direction upon the combination of the first frame 30 to the second frame 40 (an upper right direction in part (a) of FIG. 1), it becomes possible for the first rib 34 to be guided more smoothly by the second rib 44.

Figure 12:
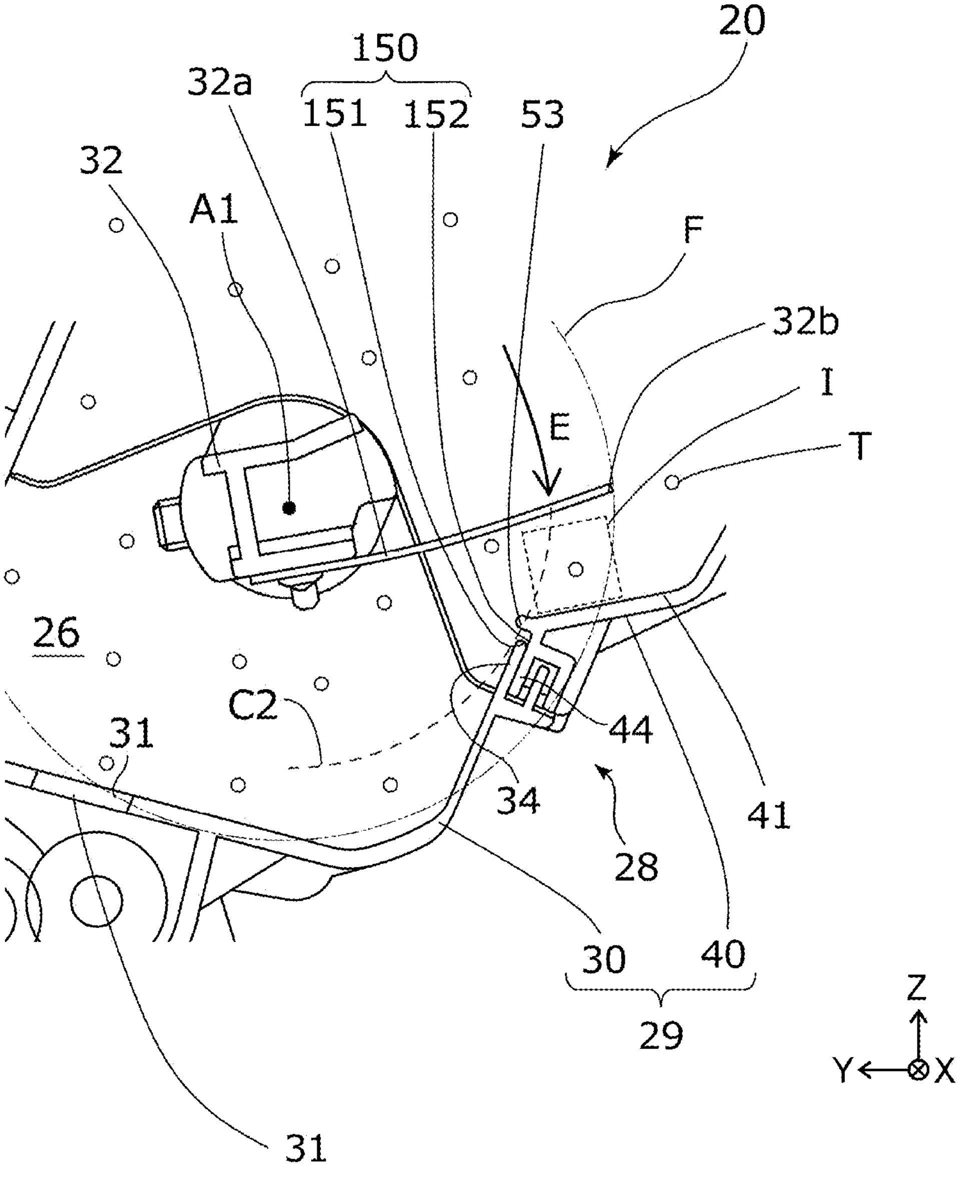
FIG. 12 is a cross-sectional view of a developing unit according to an Embodiment 2.

By the way, it is also possible to configure that the first rib 34 of the first frame 30 contacts the second rib 44 of the second frame 40 (see an Embodiment 2 in FIG. 12). In this case, however, depending on a shape error of the first frame 30 or the second frame 40 (warping during resin molding, etc.), the first rib 34 and the second rib 44 may interfere with each other upon combining the first frame 30 to the second frame 40. If the first rib 34 and the second rib 44 interfere with each other, a position of the third rib 37 relative to the recessed shape 54 may be out of a designed position in a state after the combination, and an amount of adhesive between the third rib 37 and the second rib 44 or the fourth rib 45 may become insufficient.

In the present Embodiment, a distance between the first rib 34 and the third rib 37 is set wider while permitting the groove portion 51 to be formed between the first rib 34 and the second rib 44 in the state after the combination. By this, it becomes less likely for the interference between the first rib 34 and the second rib 44 to occur upon combining the first frame 30 to the second frame 40, even in the case in which there is the shape error in the first frame 30 or the second frame 40. As a result, it becomes possible to suppress that the position of the third rib 37 relative to the recessed shape 54 is misaligned from the designed position in the state after the combination, and realize a condition in which a sufficient amount of adhesive is present between the third rib 37 and the second rib 44 and the fourth rib 45. In other words, by permitting the groove portion 51 to be formed between the first rib 34 and the second rib 44, it become less likely to be affected from the shape error of the first frame 30 and the second frame 40, and possible to adhere the first frame 30 to the second frame 40 with more stable bonding strength.

In particular, in the case in which the first frame 30 and the second frame 40 are adhered with the hot melt adhesive, in addition to the shape error upon manufacturing components of the first frame 30 or the second frame 40, deformation of the first frame 30 or the second frame 40 may occur due to heat transferred from the hot melt adhesive. Therefore, it is desirable to set the distance between the first rib 34 and the third rib 37 wider while permitting the groove portion 51 to be formed between the first rib 34 and the second rib 44. By this, it becomes less likely to be affected from the deformation of the first frame 30 or the second frame 40 due to the heat, and possible to adhere the first frame 30 to the second frame 40 with more stable bonding strength.

(Visor Portion)

Here, as shown in part (a) and part (b) of FIG. 1, the opening portion 52 of the groove portion 51 is positioned inside a rotational locus F of the stirring member 32. The rotational locus F is an imaginary circle (first imaginary circle), in which the rotational axis A1 of the stirring member 32 is a center and whose radius is a distance from the rotational axis A1 to a free end 32*b* of the elastic sheet 32*a*. The distance from the rotational axis A1 to the free end 32*b* of the elastic sheet 32*a* is referenced in a state in which the elastic sheet 32*a* is in no contact with the developing container 29. When the stirring member 32 is rotationally driven, the elastic sheet 32*a* makes sliding contacts with elements disposed inside the rotational locus F.

In the present Embodiment, a visor portion 53 is provided on the upstream side of the opening portion 52 of the groove portion 51 in the rotational direction E of the stirring member 32. The visor portion 53 is provided at a base portion of the second rib 44. The visor portion 53 is a projecting portion which projects inside the toner accommodating chamber 26 compared to the opening portion 52. The visor portion 53 projects, as seen in the direction of the rotational axis of the stirring member 32 (X axis direction), inside an imaginary circle C1 (second imaginary circle) in which the rotational axis A1 of the stirring member 32 is a center and which passes through an end fringe 34*c* of the opening portion 52. The end fringe 34*c* of the opening portion 52 is an end fringe, which is formed between an inner wall 34*b* of the toner accommodating chamber 26 (first wall surface), which extends to the downstream side of the opening portion 52 in the rotational direction E, and the end surface 34*a* of the first rib 34 (second wall surface), which is a wall surface forming the groove portion 51.

The visor portion 53 of the second frame 40 is provided on a position opposite to the end surface 34*a* so as to prevent the elastic sheet 32*a* from contacting the end surface 34*a*, on the upstream side in the rotational direction E, of the inner end portion of the recessed portion of the first frame 30 and including the part of the inner wall constituting the toner accommodating chamber 26 (first rib 34). By this, it becomes possible to reduce a possibility that the toner T enters the gap between the recessed portion of the first frame 30 and the projecting portion of the second frame 40 (groove portion 51) and the aggregated lump thereof is generated.

In other words, the developing container further includes the projecting portion provided on the upstream of the opening portion in the rotational direction and, as seen in the direction of the rotational axis, projecting inside the second imaginary circle in which the rotational axis is the center and which passes the end fringe of the opening portion. By this configuration, it becomes possible to reduce the possibility that the toner enters the groove portion 51 via the opening portion 52 during the rotation of the stirring member 32 and the aggregated lump thereof is generated in the groove portion 51.

The visor portion 53 in the present Embodiment is a part of the second frame 40. The visor portion 53 and the slope portion 41 are integrally molded by injection molding, etc. using common resin material. The visor portion 53, however, may be a separate member from the second frame 40, as in Modified Examples (FIG. 17) described below.

In a configuration of a reference example, which does not include the visor portion 53, it will be described that there is a possibility that the aggregated lump of the toner (developer aggregated lump) is generated. The developing unit 20 of the reference example has the same configuration as the developing unit 20 in the Embodiment 1, except that the visor portion 53 is not provided thereto.

In the reference example, by the rotation of the stirring member 32, the toner in the toner accommodating chamber 26 is conveyed from the upstream to the downstream in the rotational direction E by the elastic sheet 32*a*. In the reference example, as seen from the upstream side in the rotational direction E along a tangential line of the imaginary circle C1 which passes through the end fringe 34*c* of the opening portion 52, at least a part of the opening portion 52 is exposed. Because of this, a portion of the toner T, which is pushed by the elastic sheet 32*a* toward the downstream of the rotational direction E, enters into the groove portion 51. The toner T, which has entered into the groove portion 51, is pushed further into the groove portion 51 by gravity and the toner T, which is newly pushed into the groove portion 51. Then, the toner T is pressed tightly inside the groove portion 51, and the aggregated lump of the toner T may be generated.

The aggregated lump of the toner T, which is generated in the groove portion 51, may move from the groove portion 51 to the toner accommodating chamber 26 via the opening portion 52 due to changes in the attitude upon mounting and demounting of the process cartridge B, vibration applied to the process cartridge B upon the image forming operation, etc. If such aggregated lump is moved from the toner accommodating chamber 26 to the developing chamber 25 and adhered to the developing roller 21, image defect may result.

In contrast, in the present Embodiment, by the visor portion 53 being provided on the upstream side of the opening portion 52 of the groove portion 51 in the rotational direction E of the stirring member 32, it becomes less likely for the aggregated lump of the toner T to be generated in the groove portion 51. In other words, as seen from the upstream side of the rotational direction E along the tangential line of the imaginary circle C1 which passes through the end fringe 34*c* of the opening portion 52, the opening portion 52 is covered by the visor portion 53 (and the slope portion 41). Therefore, the toner T, which is pushed by the elastic sheet 32*a* toward the downstream of the rotational direction E, is less likely to enter the groove portion 51. Since it is less likely for the toner T to enter the groove portions 51, it is also less likely for the situation in which the toner T is pressed tightly in the groove portion 51 to occur. Therefore, in the present Embodiment, it becomes possible to reduce the possibility that the aggregated lump of the toner T is generated by the toner T being pressed tightly in the groove portion 51.

In the present Embodiment, in the image forming attitude of the process cartridge B (attitude when the developing unit 20 performs the development), the communication opening 31 is disposed below the opening portion 52 of the groove portion 51 in the direction of gravity. Therefore, if the aggregated lump of the toner T is generated in the toner accommodating chamber 26, due to gravity, there is a concern that it is likely for the aggregated lump to be moved to the developing chamber 25 via the communication opening 31 and adhered to the developing roller 21. Therefore, with the arrangement of the present Embodiment, it is preferable to reduce further the possibility that the aggregated lump of the toner T is generated.

Figure 9:
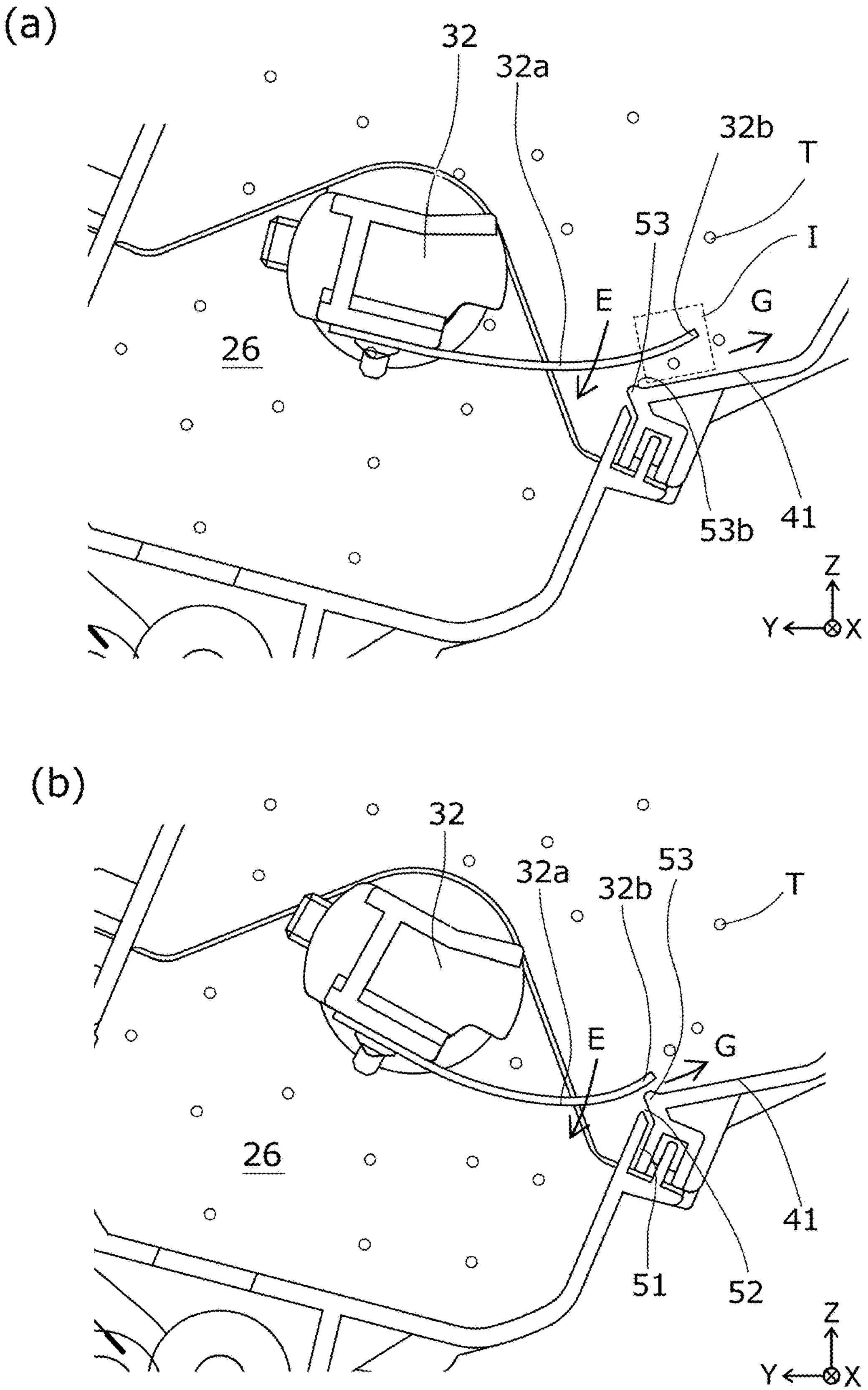
FIG. 9, part (a) and part (b), includes explanatory views of the developing unit according to the Embodiment 1.

Actions of the visor portion 53 in the present Embodiment will be further described using part (a) and part (b) of FIG. 9. In part (a) and part (b) of FIG. 9, cross-sectional views of the developing unit 20 in the imaginary plane perpendicular to the X axis direction (direction of the rotational axis of the stirring member 32) are illustrated. Part (a) of FIG. 9 illustrates a state when the stirring member 32 is moved by a small amount in the rotational direction E from a state in part (a) of FIG. 1. Part (b) of FIG. 9 illustrates a state when the stirring member 32 is moved further by a small amount in the rotational direction E from the state in part (a) of FIG. 9.

As shown in part (a) of FIG. 1, when the free end 32*b* of the elastic sheet 32*a* is positioned on the upstream side of the visor portion 53 in the rotational direction E, the toner T disposed in an area I on the upstream side of the visor portion 53 in the rotational direction E is pushed to the downstream of the rotational direction E by the elastic sheet 32*a*. The area I is an area among the elastic sheet 32*a*, the visor portion 53 and the slope portion 41 of the second frame 40.

As shown in part (a) of FIG. 9, as a position of the free end 32*b* of the elastic sheet 32*a* approaches a position of the visor portion 53 in the rotational direction E of the stirring member 32, the area among the elastic sheet 32*a*, the visor portion 53 and the slope portion 41 gets narrower.

Here, as shown in part (b) of FIG. 1, a side surface 53*b* on the upstream side of the visor portion 53 continues to the slope portion 41. In other words, a surface of the projecting portion on the upstream side in the rotational direction continues to the inner wall of the accommodating chamber on the upstream side of the opening portion in the rotational direction of the stirring member. The side surface 53*b* on the upstream side of the visor portion 53 is a surface extending to the upstream side in the rotational direction E of the stirring member 32 with respect to a vertex 53*a*, which is closest to the rotational axis A1 of the stirring member 32 in the visor portion 53.

Since the side surface 53*b* on the upstream side of the visor portion 53 continues to the slope portion 41, at least a portion of the toner T, which is pushed by the elastic sheet 32*a*, is permitted to be moved to an outside of the rotational locus F (a direction of an arrow G) along the slope portion 41. In other words, as the area among the elastic sheet 32*a*, the visor portion 53 and the slope portion 41 gets narrowed, at least a portion of the toner T, which is pushed by the elastic sheet 32*a*, is pushed, along the slope portion 41, to the outside of the rotational locus F of the elastic sheet 32*a*.

Incidentally, the side surface 53*b* of the visor portion 53 is a surface facing upside in the direction of gravity. While the extending direction of the slope portion 41 is sloped downward toward the +Y side, the side surface 53*b* of the visor portion 53 is sloped upward toward the +Y side. By this configuration, it becomes possible to reduce a possibility that the toner T, which has slidden down along the slope portion 41, slides down the visor portion 53 and falls into the opening portion 52.

As shown in part (b) of FIG. 9, when the stirring member 32 is further rotated, the free end 32*b* of the elastic sheet 32*a* passes through the opening portion 52 of the groove portion 51. At this time, since at least a portion of the toner T, which is pushed from the area I by the elastic sheet 32*a*, has already been pushed out to the outside of the rotational locus F, an amount of the toner T conveyed to a vicinity of the opening portion 52 of the groove portion 51 by the free end 32*b* of the elastic sheet 32*a* is small. In other words, by the side surface 53*b* on the upstream side of the visor portion 53 continuing to the slope portion 41, at least a portion of the toner T, which is pushed by a portion including the free end 32*b* of the elastic sheet 32*a*, is permitted to escape to the outside of the rotational locus F of the elastic sheet 32*a*. Therefore, it becomes possible to reduce an amount of the toner T which enters the groove portion 51 through the opening portion 52 of the groove portion 51 and reduce the possibility that the aggregated lump of the toner T is generated in the groove portion 51.

(Shape of a Longitudinal End of the First Rib)

A position and a shape of an end surface of the first rib 34 in the X axis direction (direction of the rotational axis of the stirring member 32, longitudinal direction of the developing unit 20) will be described using FIG. 10 and FIG. 11.

Figure 10:
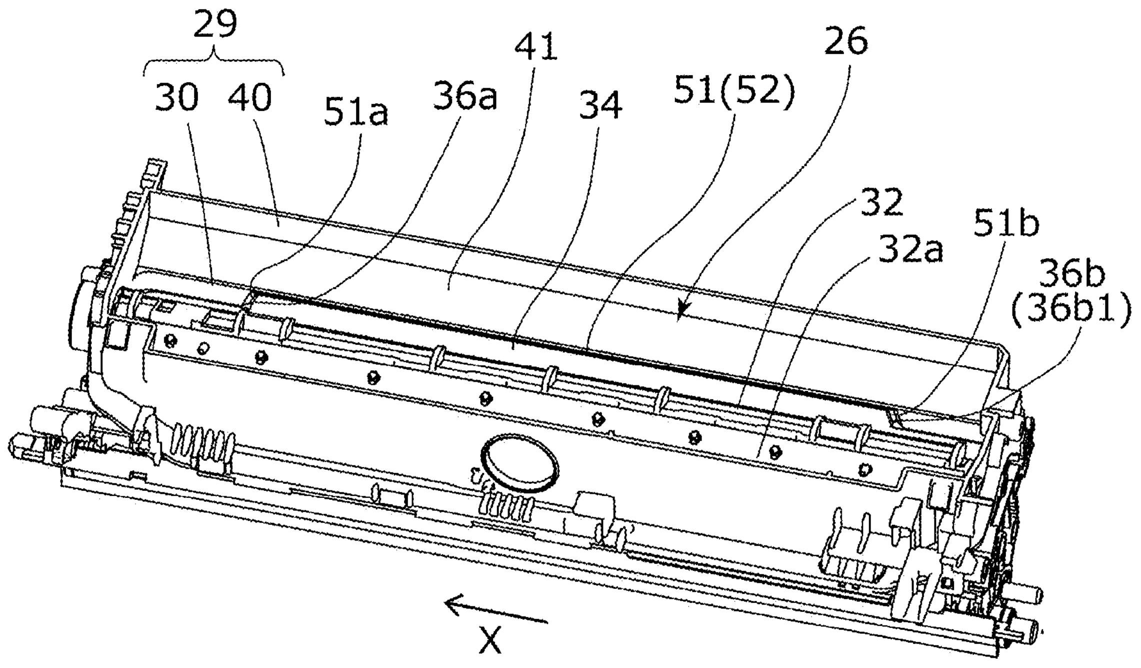
FIG. 10 is an explanatory view of a first rib according to the Embodiment 1.

FIG. 10 is a perspective view of the developing unit 20 illustrating an inside of the toner accommodating chamber 26. FIG. 11 is an enlarged view illustrating a shape of an end portion of the first rib 34.

As shown in FIG. 10, a length of the first rib 34 in the X axis direction is shorter than the length of the elastic sheet 32*a* in the X axis direction. The groove portion 51 between the first rib 34 and the second rib 44 is exposed to the toner accommodating chamber 26 in opening portions 51*a*, 51*b* in outer sides of end portions 36*a*, 36*b* of the first rib 34 in the X axis direction.

The shape of the end portion 36*a* (end portion on the +X side) of the first rib 34 in the X axis direction will be described using FIG. 11. Incidentally, since the shape of the end portion 36*b* on the other side in the X axis direction (end portion on the −X side in FIG. 10) is the same as that of the end portion 36*b* being inverted in the X axis direction, description thereof will be omitted.

Figure 11:
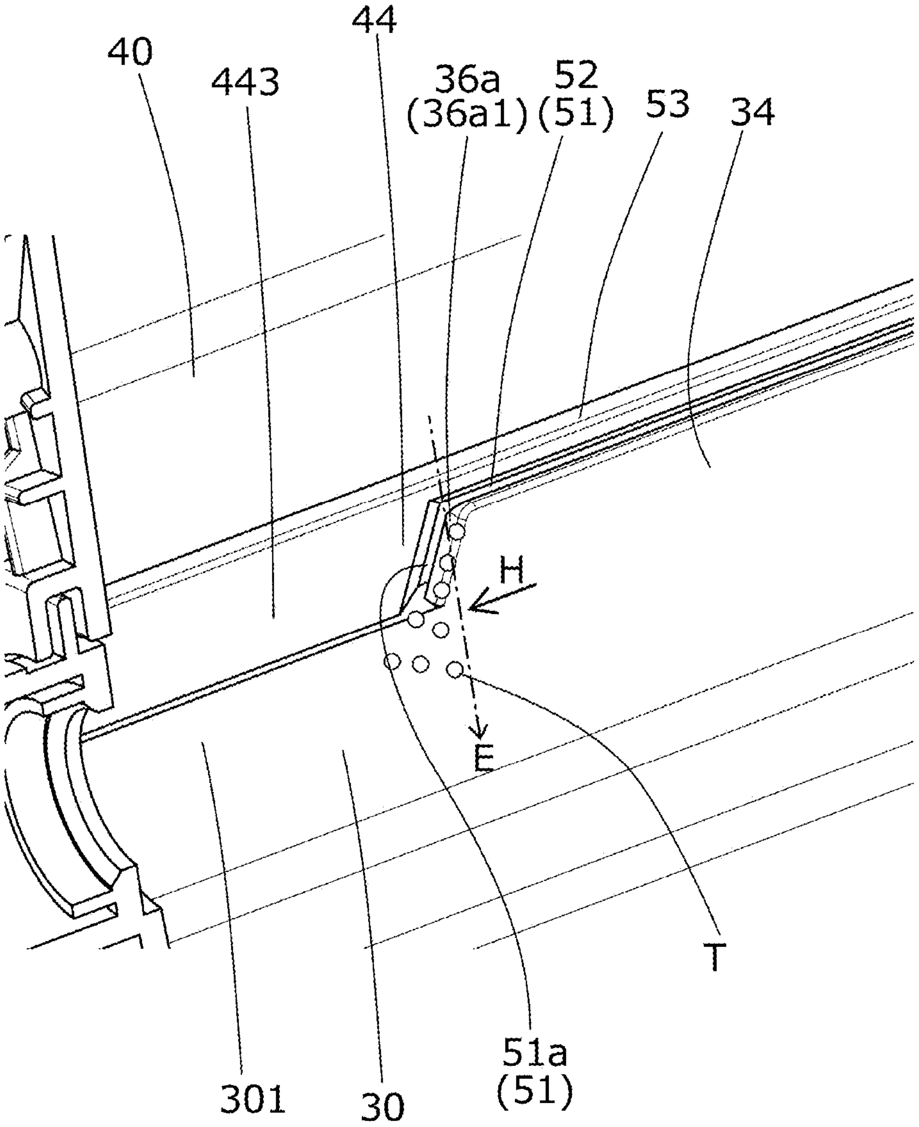
FIG. 11 is an explanatory view of the first rib according to the Embodiment 1.

As shown in FIG. 11, the end portion 36*a* of the first rib 34 in the X axis direction includes a slope 36*a*1, which is inclined with respect to the imaginary plane perpendicular to the X axis direction. An entire end portion 36*a* may be the slope 36*a*1. A direction of the inclination of the slope 36*a*1 is a direction toward an outer side of the longitudinal direction of the developing unit 20 (+X side) from the end portion of the first rib 34 on the upstream side in the rotational direction E of the stirring member 32 to the downstream side thereof. In other words, at least a part of the end surface of the first rib in the direction of the rotational axis is inclined toward the downstream side in the rotational direction and to a side away from a center of the sheet member with respect to the direction of the rotational axis.

When the toner T, which is conveyed to a vicinity of the end portion 36*a* of the first rib 34, falls following the gravity, the toner T contacts the slope 36*a*1 of the end portion 36*a* and is moved to the outer side in the longitudinal direction of the developing unit 20 (+X side) (a direction of an arrow H in FIG. 11). Therefore, it becomes less likely for the toner T, which is conveyed to the vicinity of the end portion 36*a*, to enter the groove portion 51, and possible to reduce further the possibility of the aggregated lump of the toner T is generated in the groove portion 51. By providing a slope 36*b*1 on the end portion 36*b* on the other side of the first rib 34 as well (FIG. 10), the similar advantage can be obtained.

Incidentally, in both outer sides of the first rib 34 in the X axis direction, the second rib 44 forms an inner wall 443 of the toner accommodating chamber 26 (FIG. 12). In the second rib 44, portions which are disposed both outer sides of the first ribs 34 in the X axial direction (portions forming the inner wall 443) are formed thicker than a portion which forms the groove portion 51 together with the first rib 34. By this, it becomes possible to reduce a step between the inner wall 443 of the second rib 44 and a wall surface 301 of the first frame 30 adjacent to the inner wall 443 on the downstream side in the rotational direction E.

(Summary of the Present Embodiment)

As described above, by providing the visor portion 53 on the upstream side of the opening portion 52 of the groove portion 51 in the rotational direction E of the stirring member 32, it becomes less likely for the toner T to enter the groove portion 51 and possible to suppress the aggregated lump of the toner T is generated in the groove portion 51. In addition, since it becomes less likely for the aggregated lump of the toner T to be generated, it becomes possible to reduce the possibility for the image defect to occur due to the lump of the toner T being moved from the toner accommodating chamber 26 to the developing chamber 25 and adhered to the developing roller 21.

In addition, by providing the slopes **36*a*1, 36*b*1 in the end portions 36*a*, 36*b* of the first rib 34, it becomes possible to reduce further the possibility for the aggregated lump of the toner T to be generated in the groove portion 51**.

In recent years, as a speed of the image forming apparatus (a number of printed sheets per unit time) is increased, an amount of heat generated upon performing the image forming operation and a frequency of toner particles being rubbed against each other tend to increase. Due to the increase in the amount of the generated heat, temperature of the toner in toner accommodating chamber 26 rises and external additives are peeled off from the toner particles, which may result that the aggregated lump of the toner T is generated more profoundly. According to the present Embodiment, it becomes possible to suppress the generation of the aggregated lump of the toner T even in an unfavorable condition for suppressing the aggregated lump of the toner T as the speed of image forming apparatus is increased.

In addition, in recent years, there is a trend to use the toner T having a lower melting point in order to improve energy saving performance of the image forming apparatus. This is because if the melting point of the toner T is low, better fixing performance can be obtained even if a heating temperature of the fixing portion 105 is set low. On the other hand, the toner T having the lower melting point generally tends to aggregate more easily than the toner T having a higher melting point. According to the present Embodiment, it becomes possible to suppress the generation of the aggregated lump of the toner T even in a case in which the toner T having a low melting point is used.

(Modified Examples)

In the present Embodiment, the case in which the groove portion 51 is formed at the bonding portion 28 between the first frame 30 and the second frame 40, which form the developing container 29, is described, however, the groove portion may be formed at a portion other than the bonding portion between the frames. The groove portion 51 may be, for example, a groove shape formed inside of the developing container 29 as a recessed shape, which is fitted to a jig (metal component which holds the developing container 29) of an automatic assembly device used to assemble the developing unit 20, is formed on an outer surface of the developing container 29.

In addition, in the present Embodiment, the configuration in which the first frame 30 and the second frame 40 are adhered together mainly using the hot melt adhesive is described as the example, however, the bonding method of the first frame 30 and the second frame 40 is not limited thereto. For example, in a case of welding the third rib 37 of the first frame 30 and the second rib 44 of the second frame 40, it may be a configuration in which the groove portion 51 is formed between the first rib 34 and the second rib 44.

Figure 17:
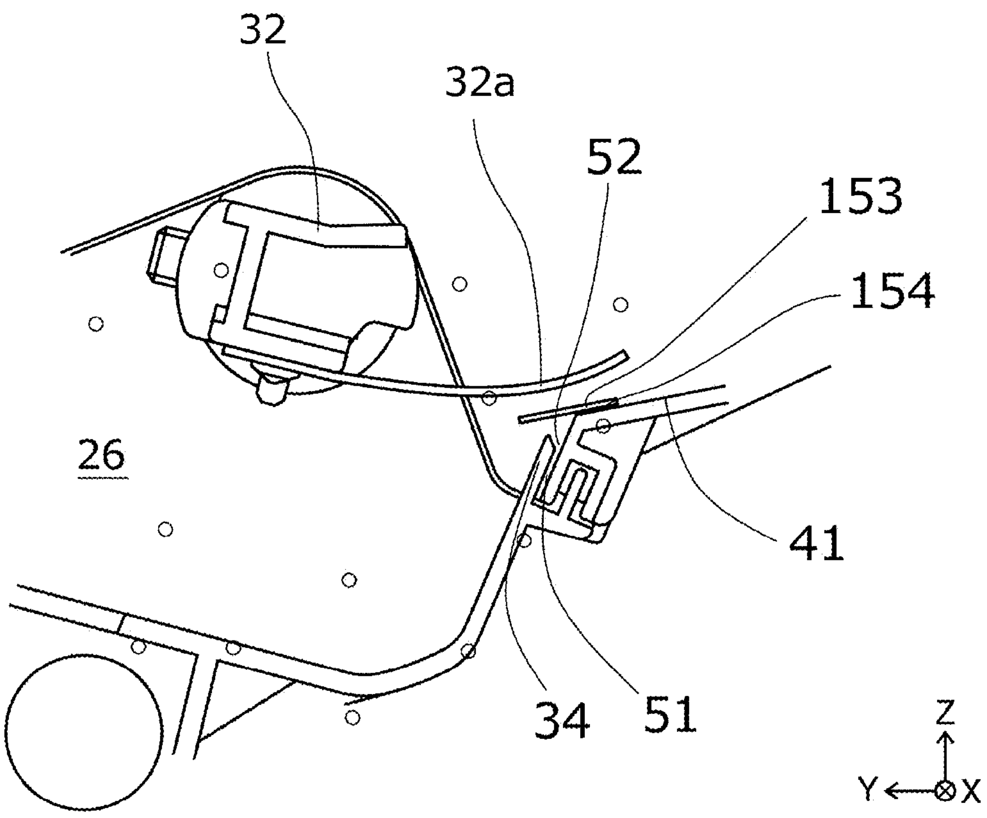
FIG. 17 is a cross-sectional view of a developing unit according to a Modified Example.

In the present Embodiment, the example in which the visor portion 53 is integrally molded with the slope portion 41 of the second frame 40, etc. is described, however, as shown in FIG. 17, the visor portion may be a sheet-shaped member 153 attached to the second frame 40. In the Modified Example in FIG. 17, the sheet-shaped member 153 is, for example, adhered to the slope portion 41 by a double-sided tape 154 and projecting to the downstream of a downstream end of the slope portion 41 in the rotational direction E of the stirring member 32. The sheet-shaped member 153 is, for example, a resin sheet having flexibility (elasticity).

In this manner, by providing the sheet-shaped member 153 as the visor portion on the upstream side of the opening portion 52 of the groove portion 51 in the rotational direction E of the stirring member 32, it becomes less likely for the toner T to enter the groove portion 51 and possible to suppress the generation of the aggregated lump of the toner T in the groove portion 51. In addition, since it becomes less likely for the aggregated lump of the toner T to be generated, it becomes possible to reduce the possibility for the image defect to occur due to the lump of the toner T being moved from the toner accommodating chamber 26 to the developing chamber 25 and adhered to the developing roller 21.

Embodiment 2

A developing unit 20 according to an Embodiment 2 will be described using FIG. 12 through part (b) of FIG. 14. The developing unit 20 in the present Embodiment can be used as a portion of the process cartridge B in the same way as the developing unit 20 in the Embodiment 1. Hereinafter, elements with common reference numerals to the Embodiment 1 are considered to be provided with basically the same configurations and actions as those described in the Embodiment 1 unless otherwise described, and portions which differ from the Embodiment 1 will be mainly described.

FIG. 12 is a cross-sectional view of the developing unit 20 in the imaginary plane perpendicular to the X axis direction (direction of the rotational axis of the stirring member 32). In the present Embodiment, to the bonding portion 28 between the first frame 30 and the second frame 40 of the developing container 29, the groove portion 51 (part (a) and part (b) of FIG. 1) as in the Embodiment 1 is not provided, but a first rib 34 and a second rib 44 contact each other. However, by a tip of the first rib 34 (end surface on the +Z side) and a side surface of the second rib 44 (side surface on the toner accommodating chamber 26 side), a step portion 150 is formed. The other elements of the bonding portion 28 are the same as the bonding portion 28 in the Embodiment 1.

The step portion 150 includes an upper surface of the step 151, which is an end surface on the +Z side of the first rib 34, and a wall surface of the step 152, which is the side surface of the second rib 44 extending from the upper surface of the step 151 approximately to +Z side. The upper surface of the step 151 and the wall surface of the step 152 are extending to directions crossing with each other.

In other words, the developing container includes a first surface (the upper surface of the step 151), which faces upside in the direction of gravity in the attitude of the developing unit upon performing the development (attitude of the developing unit 20 when the process cartridge B is in the image forming attitude). The first surface faces the upstream side in the rotational direction E of the stirring member 32. In addition, the developing container includes a second surface (the wall surface of the step 152) extending from an end portion of the first surface on an away side from the rotational axis to the upstream side in the rotational direction. In the present Embodiment, the first surface (upper surface of the step 151) is provided to the first frame 30 and the second surface (wall surface of the step 152) is provided to the second frame 40, however, the first surface and the second surface may be provided to the same frame which forms the developing container 29.

As seen in the direction of the rotational axis A1 of the stirring member 32 (X axis direction) as shown in FIG. 12, the step portion 150 (especially the upper surface of the step 151) is positioned inside the rotational locus F of the stirring member 32. In other words, the first surface is disposed, as seen in the direction of the rotational axis, inside the first imaginary circle in which the rotational axis is the center and whose radius is the length from the rotational axis to the free end of the sheet member.

On the upstream side of the step portion 150 (upstream side of the upper surface of the step 151) in the rotational direction E of the stirring member 32, a visor portion 53 is provided. The visor portion 53 is provided at a base portion of the second rib 44. The visor portion 53 extends inside the toner accommodating chamber 26 compared to the upper surface of the step 151. In other words, at least a part of the visor portion 53 projects inside the imaginary circle C2 (second imaginary circle) in which the rotational axis A1 of the stirring member 32 is a center and which passes through an end portion of the upper surface of the step 151 on a closer side to the rotational axis A1.

In the present Embodiment as well, the visor portion 53 is provided on a position opposite to the end surface 34*a* so as to prevent the elastic sheet 32*a* from contacting the end surface 34*a*, on the upstream side in the rotational direction E, of the inner end portion of the recessed portion of the first frame 30 and including the part of the inner wall constituting the toner accommodating chamber 26 (first rib 34). By this, it becomes possible to reduce a possibility that the toner T is accumulated in the step portion 150 formed by the end surface 34*a* of the first frame 30 and the projecting portion of the second frame 40 and the aggregated lump is generated.

In other words, the developing container includes the projecting portion provided on the upstream side of the first surface in the rotational direction, which projects, as seen in the rotational axis direction, inside the second imaginary circle in which the rotational axis is the center and which passes through the end portion of the first surface on the closer side to the rotational axis. By this configuration, it becomes possible to reduce the possibility that the aggregated lump of the toner is generated in the step portion 150 upon the rotation of the stirring member 32.

In the present Embodiment, a gap is provided between the upper surface of the step 151 and the visor portion 53. It is desirable that the gap be small. The upper surface of the step 151 and the visor portion 53 may contact each other.

The upper surface of the step 151 preferably extends, in the direction of the rotational axis A1 of the stirring member 32 (X axis direction), over an entire length or a range encompassing the entire length of the elastic sheet 32*a*. In other words, in the direction of the rotational axis, the length of the first rib is preferably equal to or longer than the length of the sheet member. By this, it becomes possible to reduce pressure which is received by the toner T accumulated on the upper surface of the step 151 upon contacting the elastic sheet 32*a*, and less likely for the aggregated lump of the toner T to be generated.

The visor portion 53 in the present Embodiment is a part of the second frame 40. The visor portion 53 and the slope portion 41 are integrally molded by injection molding, etc. using common resin material. The visor portion 53 may be, however, a sheet-shaped member (a separate member from the second frame 40) attached to the slope portion 41 of the second frame 40 with a double-sided tape, etc.

In a reference example, in which the visor portion 53 is not provided, a case in which the aggregated lump of the toner T is generated will be described. Part (a) and part (b) of FIG. 13 is an explanatory view of the developing unit in the reference example in which the visor portion 53 is not provided.

Figure 13:
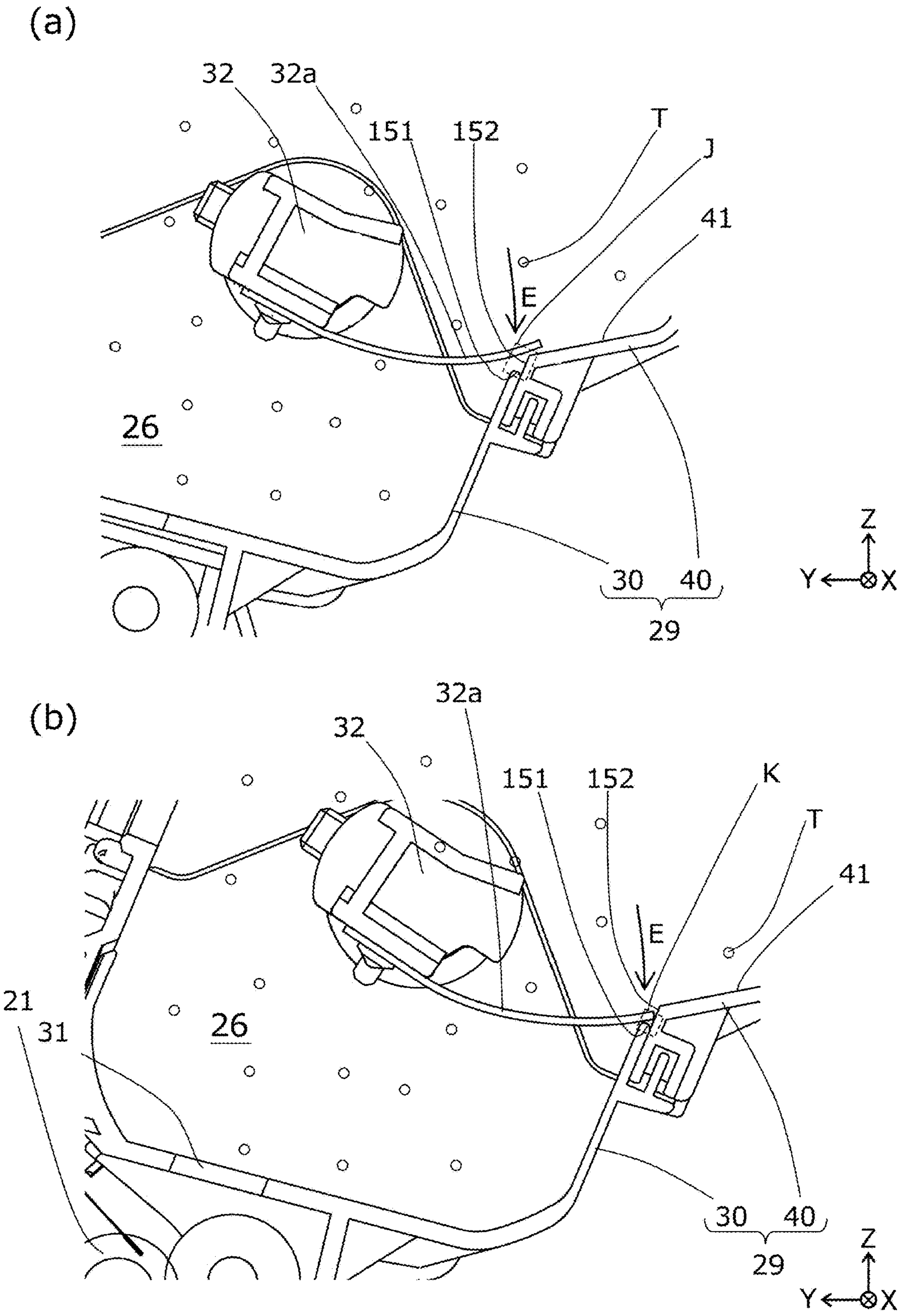
FIG. 13, part (a) and part (b), includes explanatory views of a developing unit according to a reference example.

As shown in part (a) of FIG. 13, the toner T is pressed to the downstream side in the rotational direction E by the elastic sheet 32*a* upon the rotation of the stirring member 32. At this time, the free end 32*b* of the elastic sheet 32*a* is in contact with the slope portion 41 of the second frame 40 and the elastic sheet 32*a* is flexed so that the free end 32*b* is delayed compared to a base portion. In addition, the toner T is moved to an area J, which is approximately surrounded by a portion including the free end 32*b* of the elastic sheet 32*a*, the upper surface of the step 151 and the wall surface of the step 152.

When the stirring member 32 is further rotated from the state of part (a) of FIG. 13, it becomes a state illustrated in part (b) of FIG. 13. In this state, the free end 32*b* of the elastic sheet 32*a* is released from being in contact with the slope portion 41 and the flex thereof is released to a state of being in contact with the upper surface of the step 151. At this time, the toner T in a range indicated by an area K near the free end 32*b* of the elastic sheet 32*a* is pressed into the space approximately closed by the upper surface of the step 151, the wall surface of the step 152 and the elastic sheet 32*a*. Therefore, by continuing the rotation of the stirring member 32 and by the toner T remaining in a corner portion between the upper surface of the step 151 and the wall surface of the step 152 being compressed repeatedly by the elastic sheet 32*a*, the toner T may become the aggregated lump.

The aggregated lump of the toner T, which is made at the corner portion between the upper surface of the step 151 and the wall surface of the step 152 may be mixed with the toner T in the toner accommodating chamber 26 due to changes in the attitude upon mounting and demounting of the process cartridge B, vibration applied to the process cartridge B upon the image forming operation, etc. If such aggregated lump is moved from the toner accommodating chamber 26 to the developing chamber 25 and adhered to the developing roller 21, image defect may result.

In contrast, in the present Embodiment, the visor portion 53 is provided on the upstream side of the upper surface of the step 151 in the rotational direction E of the stirring member 32. By this, it becomes less likely for the toner T to remain in the corner portion between the upper surface of the step 151 and the wall surface of the step 152 and possible to reduce the generation of the aggregated lump of the toner T.

Figure 14:
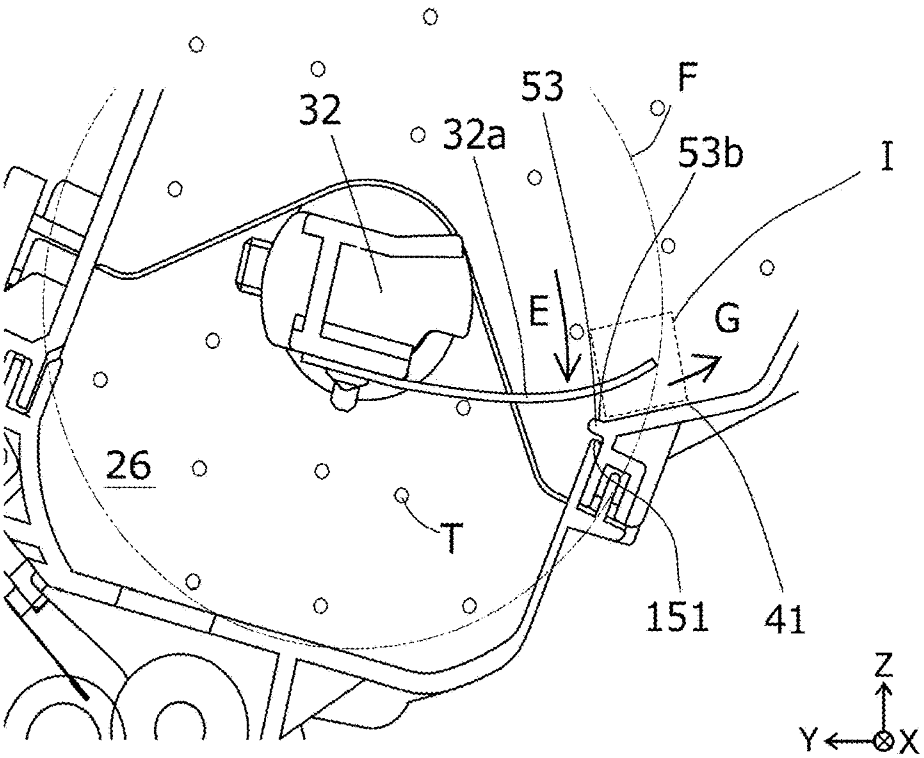
FIG. 14, part (a) and part (b), includes explanatory views of the developing unit according to the Embodiment 2.
Figure 14:
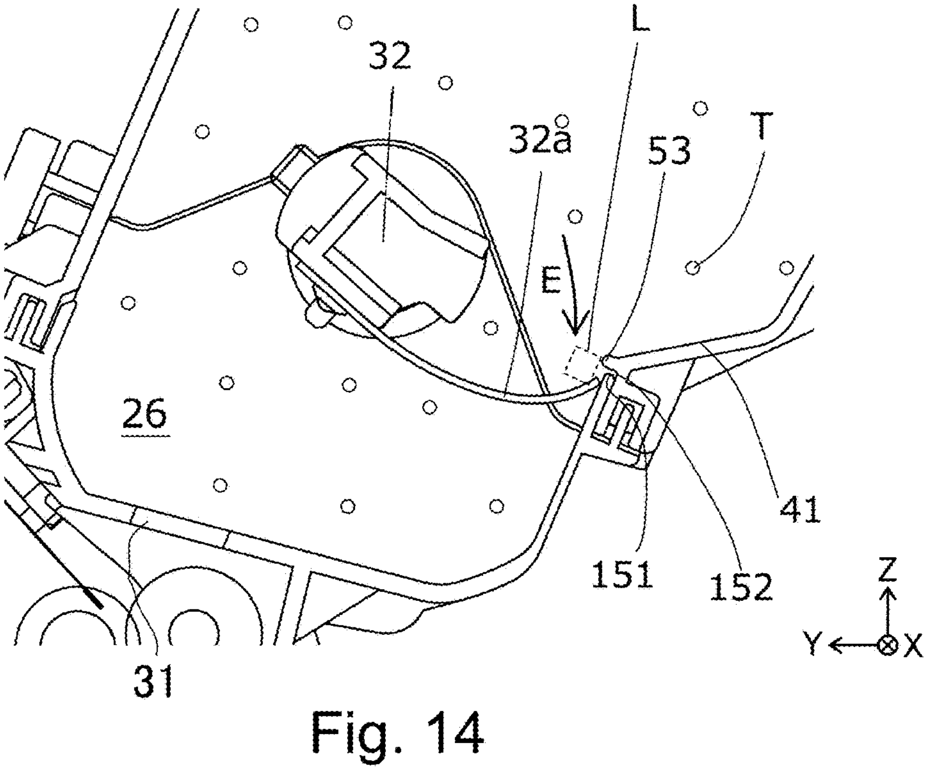

Actions of the visor portion 53 in the present Embodiment will be further described using part (a) and part (b) of FIG. 14. In part (a) and part (b) of FIG. 14, cross-sectional views of the developing unit 20 in the imaginary plane perpendicular to the X axis direction (direction of the rotational axis of the stirring member 32) are illustrated. Part (a) of FIG. 14 illustrates a state when the stirring member 32 is moved by a small amount in the rotational direction E from the state in FIG. 12. Part (b) of FIG. 14 illustrates a state when the stirring member 32 is moved further by a small amount in the rotational direction E from the state in part (a) of FIG. 14.

As shown in FIG. 12, when the free end 32*b* of the elastic sheet 32*a* is positioned on the upstream side of the visor portion 53 in the rotational direction E, the toner T disposed in an area I, which is on the upstream side of the visor portion 53 in the rotational direction E, is pushed to the downstream of the rotational direction E by the elastic sheet 32*a*. The area I is an area among the elastic sheet 32*a*, the visor portion 53 and the slope portion 41 of the second frame 40.

As shown in part (a) of FIG. 14, as a position of the free end 32*b* of the elastic sheet 32*a* approaches a position of the visor portion 53 in the rotational direction E of the stirring member 32, the area among the elastic sheet 32*a*, the visor portion 53 and the slope portion 41 gets narrower.

Here, as shown in part (a) of FIG. 14, a side surface 53*b* on the upstream side of the visor portion 53 continues to the slope portion 41 of the second frame 40. The side surface 53*b* on the upstream side of the visor portion 53 is a surface extending to the upstream side in the rotational direction E of the stirring member 32 with respect to a vertex 53*a*, which is closest to the rotational axis A1 of the stirring member 32 in the visor portion 53.

Since the side surface 53*b* on the upstream side of the visor portion 53 continues to the slope portion 41, at least a portion of the toner T, which is pushed by the elastic sheet 32*a*, is permitted to be moved to an outside of the rotational locus F (a direction of an arrow G) along the slope portion 41. In other words, as the area among the elastic sheet 32*a*, the visor portion 53 and the slope portion 41 gets narrowed, at least a portion of the toner T, which is pushed by the elastic sheet 32*a*, is pushed out, along the slope portion 41, to the outside of the rotational locus F of the elastic sheet 32*a*.

Incidentally, the side surface 53*b* of the visor portion 53 is the surface facing upward in the direction of gravity. While the extending direction of the slope portion 41 is sloped downward toward the +Y side, the side surface 53*b* of the visor portion 53 is sloped upward toward the +Y side. By this configuration, it becomes possible to reduce a possibility that the toner T, which has slidden down along the slope portion 41, slides down the visor portion 53 and falls into the opening portion 52.

As shown in part (b) of FIG. 14, as the stirring member 32 is rotated further, the free end 32*b* of the elastic sheet 32*a* is separated from the visor portion 53 and passes through the upper surface of the step 151. At this time, since at least a portion of the toner T, which is pushed from the area I by the elastic sheet 32*a*, has already been pushed out to the outside of the rotational locus F, an amount of the toner T conveyed to a vicinity of the corner portion between the upper surface of the step 151 and the wall surface of the step 152 by the free end 32*b* of the elastic sheet 32*a* is small. In other words, by the side surface 53*b* on the upstream side of the visor portion 53 continuing to the slope portion 41, at least a portion of the toner T, which is pushed by a portion including the free end 32*b* of the elastic sheet 32*a*, is permitted to escape to the outside of the rotational locus F of the elastic sheet 32*a*. Therefore, it becomes possible to reduce an amount of the toner T which enters the corner portion between the upper surface of the step 151 and the wall surface of the step 152 and reduce the possibility that the aggregated lump of the toner T is generated in the corner portion.

In addition, when the free end 32*b* of the elastic sheet 32*a* is separated from the visor portion 53 and the flex of the elastic sheet 32*a* is released, the free end 32*b* of the elastic sheet 32*a* does not contact the upper surface of the step 151. Therefore, even if the toner T is present in the corner portion between the upper surface of the step 151 and the wall surface of the step 152, since it does not happen that the toner T is repeatedly compressed by the elastic sheet 32*a*, it is less likely for the aggregated lump of the toner T to be generated.

In the present Embodiment, in the image forming attitude of the process cartridge B (attitude when the developing unit 20 performs the development), the communication opening 31 is disposed below the upper surface of the step 151 of the step portion 150 in the direction of gravity. Therefore, if the aggregated lump of the toner T is generated in the step portion 150, there is a concern that it is likely for the aggregated lump to be moved to the developing chamber 25 via the communication opening 31 and adhered to the developing roller 21. Therefore, with the arrangement of the present Embodiment, it is preferable to reduce further the possibility that the aggregated lump of the toner T is generated.

As described above, by providing the visor portion 53 on the upstream side of the upper surface of the step 151 in the rotational direction E of the stirring member 32, it becomes less likely for the toner T to enter the corner portion between the upper surface of the step 151 and the wall surface of the step 152, and possible to suppress the generation of the aggregated lump of the toner T. In addition, since it becomes less likely for the aggregated lump of the toner T to be generated, it becomes possible to reduce the possibility for the image defect to occur due to the lump of the toner T being moved from the toner accommodating chamber 26 to the developing chamber 25 and adhered to the developing roller 21.

(Modified Examples)

In the present Embodiment, the example in which the step portion 150 is formed in the bonding portion 28 where the first frame 30 and the second frame 40 are bonded together is described, however, the step portion 150 may be what has other uses and functions. In the step portion 150, for example, the upper surface of the step 151 and the wall surface of the step 152 may be provided to the same frame. In addition, the step portion 150 may be, for example, a step shape formed inside of the developing container 29 as the recessed shape, which is fitted to a jig (metal component which holds the developing container 29) of an automatic assembly device used to assemble the developing unit 20, is formed on the outer surface of the developing container 29.

In the present Embodiment, the example in which the visor portion 53 is integrally molded with the slope portion 41 of the second frame 40, etc. is described, however, the visor portion may be the sheet-shaped member 153 attached to the second frame 40, as described in the Modified Examples for the Embodiment 1 (FIG. 17).

Embodiment 3

A developing unit 20 according to an Embodiment 3 will be described using FIG. 15 through part (b) of FIG. 16. The developing unit 20 in the present Embodiment can be used as a portion of the process cartridge B in the same way as the developing unit 20 in the Embodiment 1. Hereinafter, elements with common reference numerals with the Embodiment 1 are considered to be provided with basically the same configurations and actions as those described in the Embodiment 1 unless otherwise described, and portions which differ from the Embodiment 1 will be mainly described.

Figure 15:
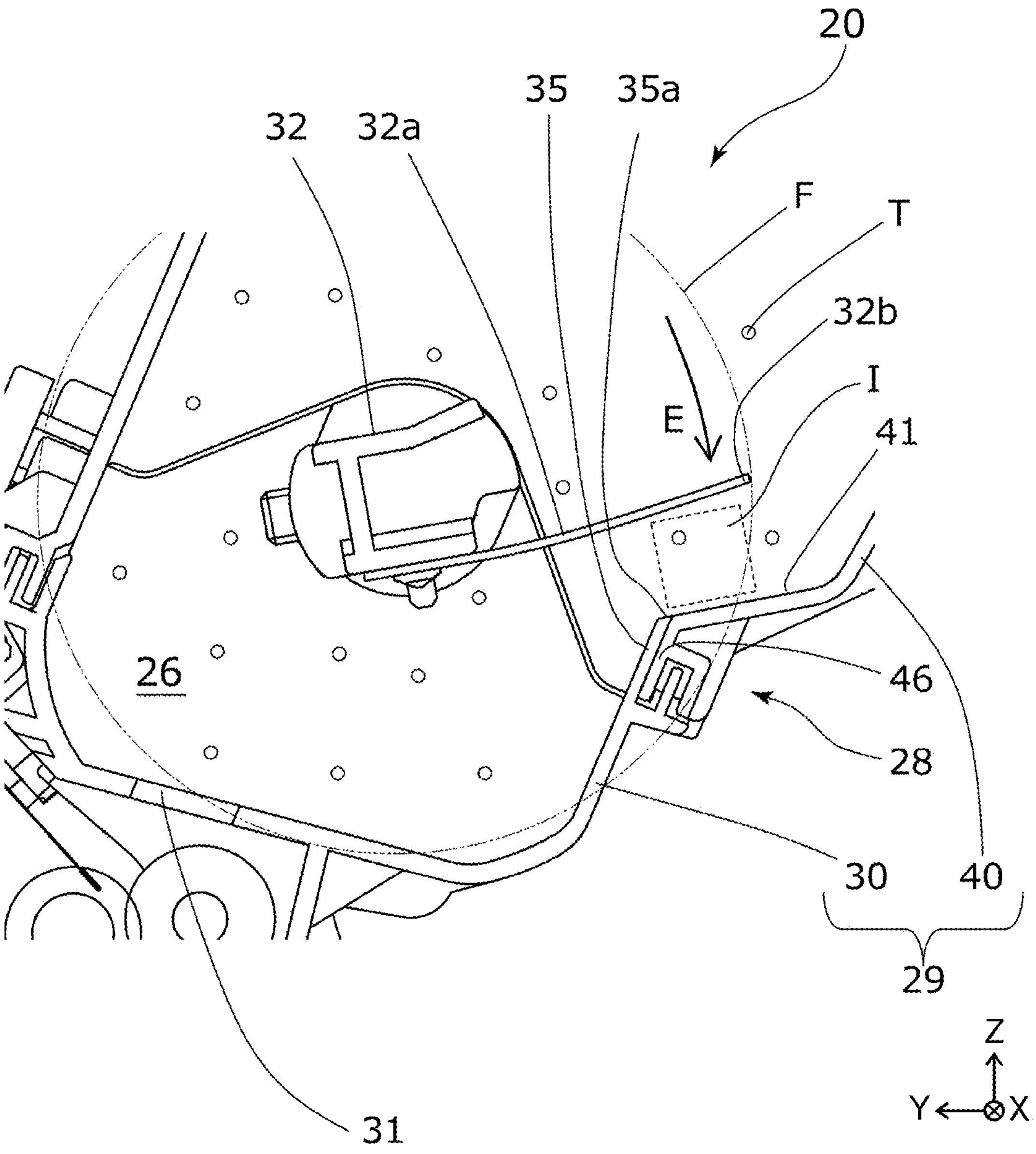
FIG. 15 is a cross-sectional view of a developing unit according to an Embodiment 3.

FIG. 15 is a cross-sectional view of the developing unit 20 in the imaginary plane perpendicular to the X axis direction (direction of the rotational axis of the stirring member 32). In the present Embodiment, to the bonding portion 28 between the first frame 30 and the second frame 40 of the developing container 29, the groove portion 51 (part (a) and part (b) of FIG. 1) as in the Embodiment 1 is not provided, but a first rib 34 and a second rib 44 contact each other.

In addition, in the present Embodiment, an end surface 34*a* of the first rib 34 is formed as a continued surface to the slope portion 41. In other words, a height of the end surface 34*a* of the first rib 34 is aligned with the slope portion 41, and there is substantially no step between the end surface 34*a* and the slope portion 41. The end surface 34*a* of the first rib 34 is an end surface on the upstream side of the first rib 34 in the rotational direction E of the stirring member 32.

As shown in FIG. 15, as seen in the direction of the rotational axis A1 of the stirring member 32 (X axis direction), a step portion 150 is positioned inside the rotational locus F of the stirring member 32, that is, step portion is substantially not formed in the rotational locus F of the stirring member 32.

Figure 16:
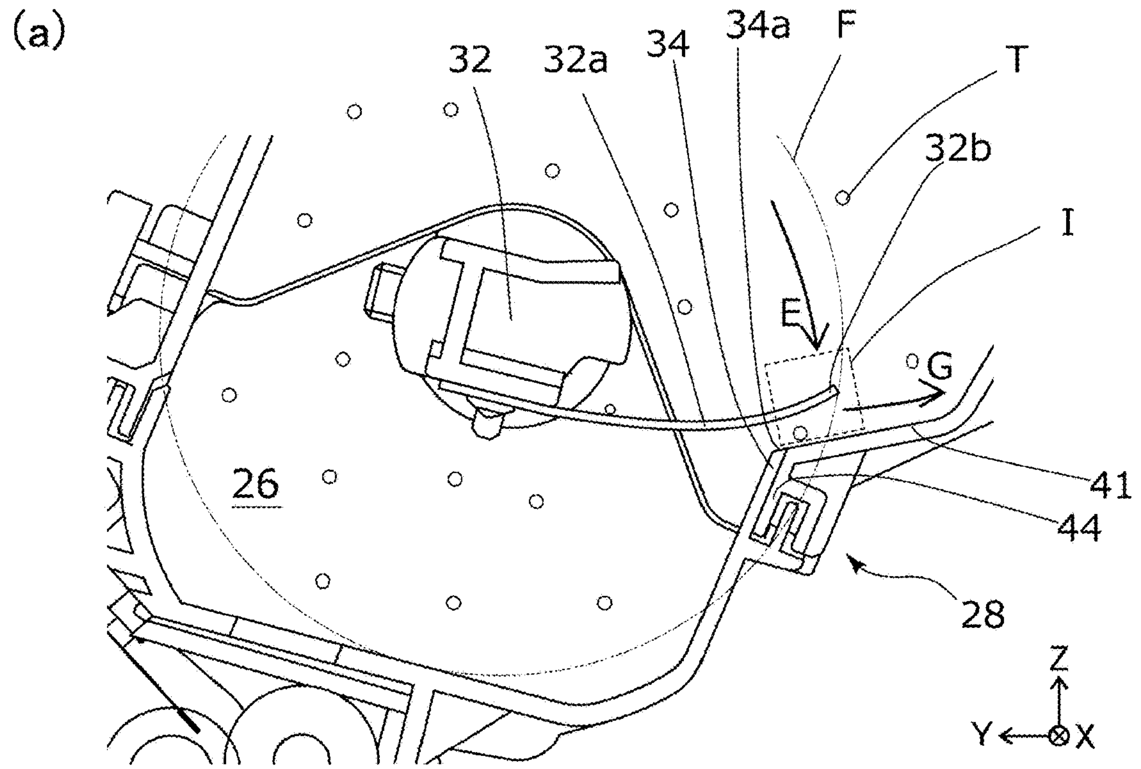
FIG. 16, part (a) and part (b), includes explanatory views of the developing unit according to the Embodiment 3.
Figure 16:
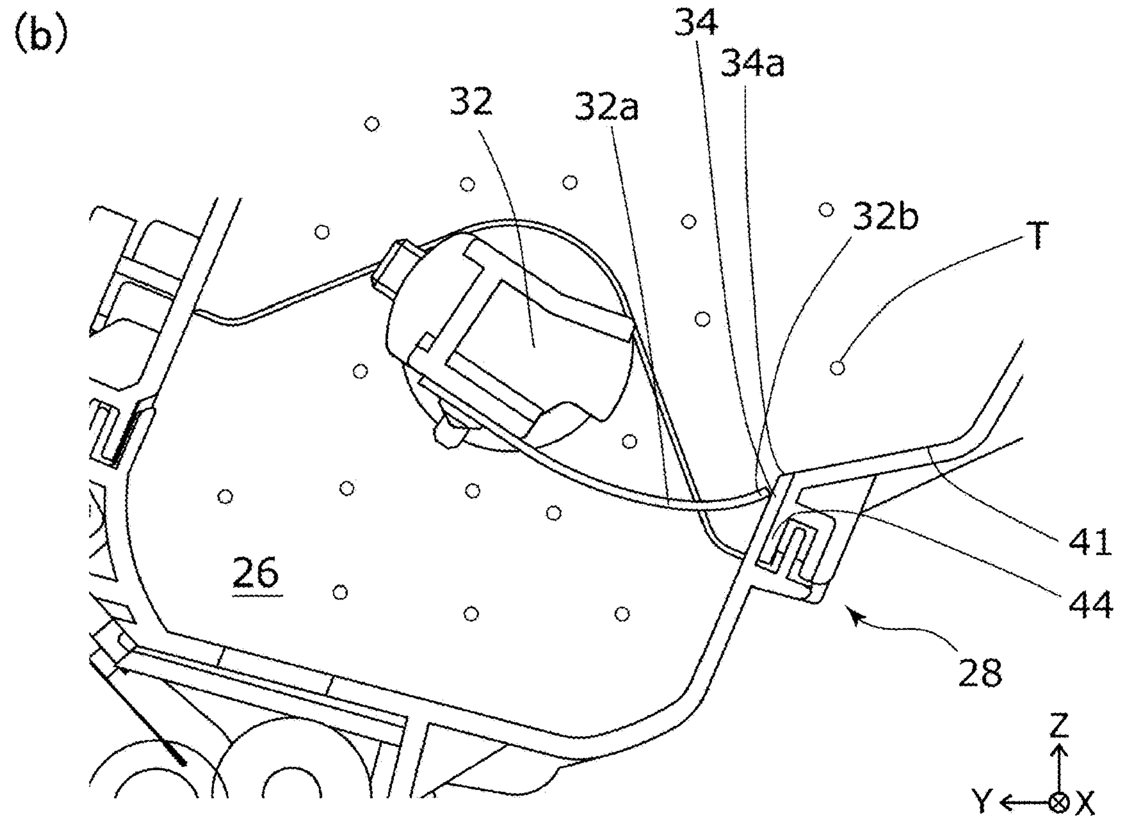

Part (a) and part (b) of FIG. 16 are explanatory views of the developing unit 20 according to the Embodiment 3. Part (a) of FIG. 16 illustrates a state when the stirring member 32 is moved by a small amount in the rotational direction E from the state in FIG. 15. Part (b) of FIG. 16 illustrates a state when the stirring member 32 is moved further by a small amount in the rotational direction E from the state in part (a) of FIG. 16.

As shown in FIG. 15, when the free end 32*b* of the elastic sheet 32*a* is positioned on the upstream side of the visor portion 53 in the rotational direction E, the toner T disposed in an area I, which is on the upstream side of the visor portion 53 in the rotational direction E, is pushed to the downstream of the rotational direction E by the elastic sheet 32*a*. The area I is an area among the elastic sheet 32*a*, the end surface 34*a* of the first rib 34 of the first frame 30 and the slope portion 41 of the second frame 40.

As shown in part (a) of FIG. 16, as a position of the free end 32*b* of the elastic sheet 32*a* approaches the position of the visor portion 53 in the rotational direction E of the stirring member 32, the area among the elastic sheet 32*a*, the visor portion 53 and the slope portion 41 gets narrower.

Here, in the present Embodiment, the end surface 34*a* of the first rib 34 and the slope portion 41 are continued. Therefore, at least a portion of the toner T, which is pushed by the elastic sheet 32*a*, is permitted to be moved outside of the rotational locus F along the slope portion 41 (a direction of an arrow G). In other words, as the area among the elastic sheet 32*a*, the end surface 34*a* of the first rib 34 and the slope portion 41 of the second frame 40 gets narrowed, at least a portion of the toner T, which is pushed by the elastic sheet 32*a*, is pushed out, along the slope portion 41, to the outside of the rotational locus F of the elastic sheet 32*a*.

As shown in part (b) of FIG. 16, when the stirring member 32 is rotated further, the free end 32*b* of the elastic sheet 32*a* passes through the end surface 34*a* of the first rib 34. At this time, since the first rib 34 and the second rib 44 contact each other and a gap like the groove portion 51 in the Embodiment 1 (part (a) of FIG. 1) is not formed, the toner T cannot enter the gap. In addition, since the end surface 34*a* of the first rib 34 continues to the slope portion 41, the toner T cannot accumulate in a step formed between the end surface 34*a* and the slope portion 41. Furthermore, since at least a portion of the toner T, which is pushed from the area I by the elastic sheet 32*a*, has already been pushed out to the outside of the rotational locus F, an amount of the toner T conveyed to a vicinity of a boundary between the first rib 34 and the slope portion 41 by the free end 32*b* of the elastic sheet 32*a* is small. Therefore, it becomes possible to reduce a possibility that the aggregated lump of the toner T is generated in the gap between the first rib 34 and the second rib 44 and in the step portion between the end surface 34*a* of the first rib 34 and the slope portion 41 (corner portion).

As described above, by configuring as the first rib 34 and the second rib 44 contact each other and the height of the end surface 34*a* of the first rib 34 is aligned with the slope portion 41, it becomes possible to suppress the generation of the aggregated lump of the toner T in the corner portion. In addition, since it becomes less likely for the aggregated lump of the toner T to be generated, it becomes possible to reduce the possibility for the image defect to occur due to the lump of the toner T being moved from the toner accommodating chamber 26 to the developing chamber 25 and adhered to the developing roller 21.

Other Embodiments

In each of the above Embodiments, the developing unit 20, which is incorporated as a part of the process cartridge B, has been described, however, it is not necessary for the developing unit 20 to be a part of the process cartridge B. For example, the developing unit 20 may be a cartridge (developing cartridge), which is mountable to and demountable from the main assembly A and independent of a cartridge including the photosensitive drum 11 (drum cartridge). In addition, the developing unit 20 may be a unit fixed to the main assembly A so as not to be mounted and demounted by a user.

In addition, the developing unit 20 is an example of a developer accommodating unit. As another example of the developer accommodating unit, to a toner cartridge, which accommodates the toner to be replenished to the developing unit 20 and is mounted on and demounted from the main assembly A independently of the process cartridge B, the configurations described in each Embodiment may be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177812 filed on Oct. 13, 2023, which is hereby incorporated by reference herein in its entirety.

What is claimed is:

1. A developer accommodating unit comprising:

a container including a first frame and a second frame mutually bonded so as to constitute an accommodating space for accommodating developer; and a stirring member configured to stir the developer accommodated in the accommodating space by being rotated in a rotational direction, the stirring member including a rotational shaft and a sheet fixed to the rotational shaft, wherein the first frame includes a recessed portion provided along an edge portion of the first frame and opening toward an upstream side in the rotational direction, and wherein the second frame includes:

a projecting portion provided along an edge portion of the second frame, the projecting portion projecting toward a downstream side in the rotational direction and engaging with the recessed portion, and a visor portion provided at a position opposite to an end surface, on the upstream side in the rotational direction, of an inner end portion of the recessed portion and including a part of an inner wall constituting the accommodating space the visor portion being configured to prevent the sheet from contacting the end surface.

2. The developer accommodating unit according to claim 1, wherein a gap is formed between a surface of the inner end portion on a side opposite to the accommodating space and a surface of the projecting portion facing the accommodating space.

3. The developer accommodating unit according to claim 2, wherein a length of the inner end portion is shorter than a length of the sheet in a direction of a rotational axis of the stirring member, and wherein at least a part of the end surface of the inner end portion in the direction of the rotational axis is inclined toward a downstream side in the rotational direction and to a side away from a center of the sheet with respect to the direction of the rotational axis.

4. The developer accommodating unit according to claim 1, wherein a surface on a side of the inner end portion opposite to the accommodating space and a surface of the projecting portion facing the accommodating space are in contact with each other, and wherein a corner portion is formed between the end surface of the inner end portion and the surface of the projecting portion facing the accommodating space.

5. The developer accommodating unit according to claim 4, wherein a length of the inner end portion is equal to or longer than a length of the sheet in a direction of a rotational axis of the stirring member.

6. The developer accommodating unit according to claim 1, wherein, as seen in a direction of a rotational axis of the stirring member, the end surface is disposed inside a first imaginary circle in which the rotational axis is a center and a length from the rotational axis to a free end of the sheet is a radius, and wherein the visor portion projects inside a second imaginary circle in which the rotational axis is a center and which passes an end fringe of the end surface on a side close to the rotational axis.

7. The developer accommodating unit according to claim 1, wherein, in a case in which the inner end portion is a first rib and the projecting portion is a second rib, (i) the first frame includes a first flange portion projecting toward outside the container with respect to the first rib and a third rib extending to the upstream side from the first flange portion in the rotational direction, and the recessed portion is formed by the first rib, the first flange portion and the third rib, (ii) the second frame includes a second flange portion projecting toward outside the container and a fourth rib extending to the downstream side from the second flange portion in the rotational direction, (iii) as seen in a direction of a rotational axis of the stirring member, a free end of the third rib is accommodated in a recessed shape formed by the second rib, the second flange portion and the fourth rib of the second frame, and (iv) the third rib and an inner surface of the recessed shape are bonded with an adhesive.

8. The developer accommodating unit according to claim 7, wherein the container further includes an engaging claw provided on either one of the first frame and the second frame and an engaged portion provided on the other of the first frame or the second frame, wherein by engagement between the engaging claw and the engaged portion, the first frame and the second frame are positioned with each other in a state in which the third rib is accommodated inside the recessed shape.

9. The developer accommodating unit according to claim 8, wherein the adhesive is a hot melt adhesive.

10. The developer accommodating unit according to claim 1, further comprising a developer roller configured to carry the developer and supply the developer to a photosensitive member, wherein the container further includes a supplying chamber in which the developer roller is disposed and a communication opening configured to communicate with the accommodating space and the supplying chamber, and wherein, when the developer accommodating unit takes an attitude of being mounted to a main assembly of an image forming apparatus, the communication opening is disposed below the end surface of the inner end portion in a direction of gravity.

11. The developer accommodating unit according to claim 1, wherein a surface of the visor portion on the upstream side in the rotational direction continues to the inner wall of the accommodating space in the second frame.

12. A process cartridge comprising:

a photosensitive member; and a developer accommodating unit according to claim 1, wherein the developer accommodating unit includes a developer roller configured to carry the developer, and supply the developer to the photosensitive member to develop a latent image on the photosensitive member.

* * * * *